US012786121B2

(12) United States Patent
Gottlieb

(10) Patent No.: US 12,786,121 B2
(45) Date of Patent: Nov. 3, 2026

(54) DISTRIBUTED SOURCE NETWORK ADDRESS TRANSLATION (SNAT) ENABLED LEAF

(71) Applicant: Charter Communications Operating, LLC, St. Louis, MO (US)

(72) Inventor: Erez Jordan Gottlieb, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 218 days.

(21) Appl. No.: 18/633,301

(22) Filed: Apr. 11, 2024

(65) Prior Publication Data

US 2025/0323866 A1 Oct. 16, 2025

(51) Int. Cl.

*H04L 61/256* (2022.01)
*H04L 45/02* (2022.01)
*H04L 45/745* (2022.01)

(52) U.S. Cl.

CPC ............ *H04L 45/745* (2013.01); *H04L 45/04* (2013.01); *H04L 61/256* (2013.01)

(58) Field of Classification Search

None
See application file for complete search history.

(56) References Cited

U.S. PATENT DOCUMENTS 7,675,920 B1 * 3/2010 Droux ..................... H04L 49/60 370/395.42
8,681,695 B1 3/2014 Krishnan
9,654,331 B1 5/2017 Singh et al.
2006/0140164 A1 6/2006 Patel et al.
2006/0159100 A1 7/2006 Droms et al.
2007/0276905 A1 11/2007 Durand et al.
2009/0285215 A1 11/2009 Kaippallimalil et al.
2012/0218910 A1 8/2012 Sarikaya
2012/0314617 A1 12/2012 Erichsen et al.
2012/0314705 A1 12/2012 Howard
2013/0103834 A1 * 4/2013 Dzerve ................... H04L 67/10 709/225
2013/0227155 A1 8/2013 Dec et al.
2013/0254423 A1 9/2013 George, IV
2013/0301650 A1 11/2013 Zou et al.
2014/0044012 A1 2/2014 Singh et al.

(Continued)

FOREIGN PATENT DOCUMENTS

WO 2014169240 A1 10/2014

*Primary Examiner* — Joshua Joo
(74) *Attorney, Agent, or Firm* — The Marbury Law Group, PLLC

(57) ABSTRACT

Various methods and processing systems for the effective management of network traffic and facilitating data forwarding within distributed computing environments. Network components may be configured to amalgamate the Border Gateway Protocol (BGP) with Source Network Address Translation (SNAT) or network address port translation (NAPT) technologies to facilitate dynamic notification of network address accessibility and use port index identifiers to augment the precision and resilience of routing. A distributed SNAT/NAPT virtual network function (VNF) or cloud-native network function (CNF) may collaborate with LEAF switches or server aggregation devices to refine data transmission via adaptable address mapping and forwarding and enhance network scalability and resilience.

12 Claims, 10 Drawing Sheets

(56) References Cited

U.S. PATENT DOCUMENTS

| | | | | |
|---|---|---|---|---|
| 2014/0215091 | A1 | 7/2014 | Singh et al. | |
| 2014/0330943 | A1 | 11/2014 | Brzozowski et al. | |
| 2015/0200806 | A1 | 7/2015 | Donley et al. | |
| 2015/0365323 | A1 * | 12/2015 | Duminuco | H04L 47/18 370/235 |
| 2016/0014071 | A1 | 1/2016 | Asati et al. | |
| 2017/0149614 | A1 | 5/2017 | Zheng et al. | |
| 2017/0302595 | A1 * | 10/2017 | Tripathi | H04L 47/10 |
| 2021/0218672 | A1 * | 7/2021 | Mackie | H04L 61/256 |
| 2022/0345439 | A1 | 10/2022 | Wheelock | |
| 2023/0012406 | A1 * | 1/2023 | Manoharan | H04L 45/586 |
| 2023/0370422 | A1 * | 11/2023 | Singh | H04L 63/0263 |
| 2025/0071063 | A1 * | 2/2025 | Kok | H04L 45/28 |
| 2025/0274388 | A1 * | 8/2025 | Singh | H04L 45/02 |
| 2025/0330421 | A1 * | 10/2025 | Kapela | H04L 12/4633 |

* cited by examiner

DISTRIBUTED SOURCE NETWORK ADDRESS TRANSLATION (SNAT) ENABLED LEAF

BACKGROUND

One of the most important characteristics of modern network communications is the ability to manage the flow of data across networks securely and efficiently. Traditional network architectures use various protocols and devices to manage the flow of data across networks. With the advent of distributed computing systems, such as cloud computing and Kubernetes-based environments, the demands on network infrastructure have increased significantly. These systems may require dynamic routing, scalability, and enhanced security measures to handle diverse and fluctuating network loads.

Traditional network routing protocols, such as the Border Gateway Protocol (BGP), have been foundational in managing data paths across different networks. Yet, these protocols often lack the flexibility and scalability needed in modern, distributed environments. Moreover, network address translation (NAT) and specifically Source Network Address Translation (SNAT) play important roles in these environments but present various challenges in terms of managing dynamic addressing in distributed systems.

Network Processing Units (NPUs) and Field-Programmable Gate Arrays (FPGAs) have been used to enhance data processing capabilities in network devices. NPUs are specialized silicon processors designed for high-speed network data processing tasks. However, they often fall short in handling complex, non-standard network operations. FPGAs include a reconfigurable architecture that could be used to overcome some of the limitations of NPUs by providing the flexibility to adapt to various network processing needs, including handling corner cases in data routing and security (e.g., DDoS mitigation, etc.).

Despite these and other technologies and advancements, there remains a need for an integrated system that combines efficient routing protocols, dynamic SNAT mechanisms, and advanced processing hardware to address the unique challenges of modern distributed computing environments. Such a system could offer scalability, flexibility, and enhanced security for efficient data forwarding and robust defense against network threats such as distributed denial of service (DDoS) attacks.

SUMMARY

Various aspects include methods of signaling the reachability of network addresses combined with port index identifiers, which may include receiving, by a processor in a LEAF switch, a border gateway protocol (BGP) signal indicating network address translation (NAT) reachability, the BGP signal which may include BGP attributes, a network address, and a port index identifier, traversing the received BGP attributes to extract relevant NAT information, using the extracted NAT information to update internal mapping tables within the LEAF switch, receiving incoming data packets, using the updated mapping tables to identify a correct atomic forwarding unit in a container orchestration platform, forwarding the data packet to the identified atomic forwarding unit, and dynamically adjusting the routing in response to determining that the identified atomic forwarding unit has moved to a different node.

Some aspects may further include monitoring network traffic to detect special cases that are not handled by standard network processing units (NPUs), and activating field-programmable gate arrays (FPGAs) or other intelligent network data processing units in response to detecting a special case that may be not handled by standard NPUs. In some aspects, receiving the BGP signal indicating NAT reachability may include receiving a BGP signal indicating source network address translation SNAT reachability, traversing the received BGP attributes to extract relevant NAT information may include traversing the received BGP attributes to extract relevant SNAT information, and using the extracted NAT information to update internal mapping tables within the LEAF switch may include using the extracted SNAT information to update internal mapping tables within the LEAF switch.

In some aspects, receiving the BGP signal indicating SNAT reachability may include receiving a BGP signal indicating network address port translation (NAPT) reachability, traversing the received BGP attributes to extract relevant SNAT information may include traversing the received BGP attributes to extract relevant NAPT information, and using the extracted SNAT information to update internal mapping tables within the LEAF switch may include using the extracted NAPT information to update internal mapping tables within the LEAF switch.

Further aspects may include methods of dynamic routing and provisioning in a distributed computing system through dynamic source network address translation (SNAT), the method which may include receiving, by a processor in a distributed SNAT smart LEAF layer component, network address translation (NAT) mappings for IPv4 addresses, initiating, by a processor in a customer premises equipment (CPE), a NAT Provisioning Request for communicating with external networks, sending, by the processor in the CPE, the NAT provisioning request to a multi-node access aggregation supporting NAPT environment (MNACCNAT) component, issuing, by a processor in the MNACCNAT component, a proxy provisioning request to a provisioning component in response to receiving the NAT provisioning request from the CPE, sending, by the provisioning components, provisioning responses to the MNACCNAT function, which relays these responses to the respective CPE, and advertising, by the processor in the MNACCNAT component, the presence of the CPE by IPv4 address plus a port set identifier and IPv4 next hop atomic object to distributed NAT LEAF switches. In some aspects, receiving the NAT mappings for the IPv4 addresses by the processor in the distributed SNAT smart LEAF layer component may include receiving the NAT mappings for the IPv4 addresses by a processor in a distributed network address port translation (NAPT) smart LEAF layer component.

Further aspects may include methods of dynamic routing and provisioning in distributed computing environments that include virtual customer premises equipment (vCPE), which may include establishing, by processors in distributed network address translation (NAT) LEAF switches, NAT mappings for IPv4 addresses to ensure outbound internet connections, activating the vCPE as an intermediary device facilitating communication between user equipment and external networks, enforcing, by a processor or an intermediary access switch, a unique VLAN tag for the vCPE to allow the multi-node access aggregation supporting NAPT environment (MNACCNAT) component to distinguish between sessions, initiating, by the vCPE through its processor, a provisioning request to the MNACCNAT for setting up a layer-3 tunnel using protocols to establish a direct connection, allocating, by a processor in the MNACCNAT component, source network address translation (SNAT) for the vCPE based on the provisioning request, and bridging, by the processor in the vCPE, traffic to designated user equipment based on the allocated SNAT.

Further aspects may include methods of dynamic network address port translation (NAPT) signaling in a network computing device, which may include integrating, by a processor, a routing protocol with a NAPT mechanism to signal the reachability of network addresses combined with port index identifiers, using, by the processor, border gateway protocol (BGP) for dynamic NAPT signaling, facilitating, by the processor, robust data forwarding through a distributed NAPT virtual network function (VNF) to a LEAF switch or server aggregation device, enhancing, by the processor, the dynamic NAPT signaling through the deployment of cloud-native network functions (CNFs) within a container orchestration platform, performing, by the processor, the dynamic NAPT signaling using BGP attributes from the distributed NAPT CNF/VNF to a LEAF switch or server aggregation device, constructing and updating, by the processor, internal mapping tables in the LEAF device based on NAPT reachability information received from the distributed NAPT CNF/VNF, and managing, by the processor, the mobility of containers or pods within the container orchestration platform to implement consistent forwarding capabilities across the various nodes.

Further aspects may include a computing device having a processor configured with processor-executable instructions to perform various operations corresponding to the methods discussed above. Further aspects may include a computing device having various means for performing functions corresponding to the method operations discussed above. Further aspects may include a non-transitory processor-readable storage medium having stored thereon processor-executable instructions configured to cause a processor to perform various operations corresponding to the method operations discussed above.

BRIEF DESCRIPTION OF THE DRAWINGS

The accompanying drawings, which are incorporated herein and constitute part of this specification, illustrate exemplary embodiments of the claims, and together with the general description given and the detailed description, serve to explain the features herein.

DETAILED DESCRIPTION

Figure 1:
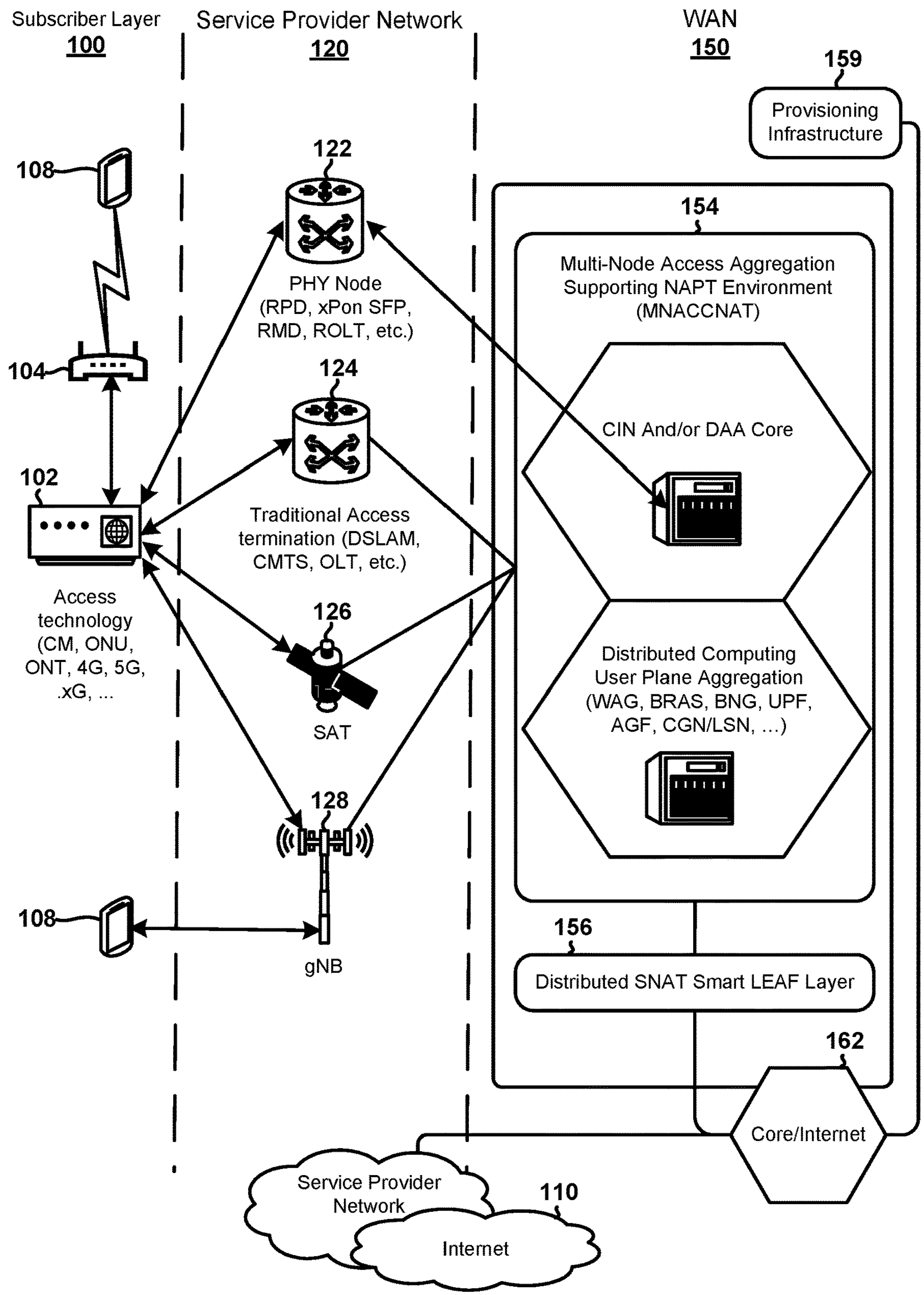
FIG. 1 is a component block diagram illustrating example systems that could be configured to implement some embodiments.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

In overview, the various embodiments include components configured to integrate a routing protocol (e.g., BGP, etc.) with source network address translation (SNAT) mechanisms (e.g., Network Address Port Translation (NAPT) mechanisms, etc.) to signal the reachability of network addresses combined with port index identifiers. BGP is a standardized exterior gateway protocol designed to exchange routing and reachability information among autonomous systems on the internet. SNAT is a technique for modifying network address information in packet headers while in transit and is typically used to enable devices on a private network to access external networks.

Some embodiments may include components configured to use BGP for dynamic SNAT signaling and/or to facilitate robust data forwarding through a distributed SNAT virtual network function (VNF) to a LEAF switch or server aggregation device. A distributed SNAT VNF may be a virtualized function that dynamically manages SNAT operations across a distributed network system to facilitate efficient and secure data flow. A LEAF switch or server aggregation device may be a networking device that aggregates traffic from multiple servers or switches and acts as a central point for data processing and routing.

In some embodiments, the dynamic SNAT signaling may be enhanced through the deployment of Cloud-Native Network Functions (CNFs) within a container orchestration platform (e.g., Kubernetes environment, etc.). CNFs may include containerized microservices that provide enhanced scalability and resilience compared to traditional VNFs.

In some embodiments, the dynamic SNAT signaling may be performed using well-known BGP attributes such as communities or Multi-Exit Discriminator (MED) from the distributed SNAT CNF/VNF to a LEAF switch or server aggregation device. The LEAF device may receive SNAT reachability information, including the network address and port index identifier, from the distributed SNAT CNF/VNF. This information may allow the LEAF device to construct and update its internal mapping tables. That is, the LEAF device may use this data to recurse applicable tables and accurately forward data to the correct atomic forwarding unit, which may be any container or pod in a container orchestration platform (e.g., Kubernetes environment, etc.) and/or located on any node of the distributed system.

In some embodiments, the components may be configured to manage the mobility of containers or pods within container orchestration platforms and ensure consistent forwarding capabilities across various nodes. In some embodiments, the components may be configured to manage complex tasks and corner cases, such as fragment forwarding, by integrating traditional network processing units (NPUs) with field-programmable gate arrays (FPGAs), processors, CPUs, network data processing units (DPUs), etc. In some embodiments, the components may be configured to perform distributed denial of service (DDoS) mitigation and use FPGAs for real-time, high-volume data handling.

The embodiments may provide a significant technical advancement in network management in distributed computing environments. The embodiments may provide flexible and robust technical solutions to technical challenges faced by conventional networks, such as by integrating advanced routing protocols with dynamic SNAT mechanisms and leveraging the processing capabilities of NPUs and FPGAs. The embodiments may ensure efficient data forwarding, accommodate dynamic network changes, and enhance security against network threats such as DDoS attacks. The embodiments may adapt to the changing positions of containers or pods within a distributed network environment for uninterrupted connectivity and service delivery. For these and other reasons, the various embodiments improve the performance and functioning of the communication network and its constituent components.

The term "service provider network" is used generically herein to refer to any network suitable for providing consumers with access to the Internet or IP services over broadband connections and may encompass both wired and wireless networks/technologies. Examples of wired network technologies and networks that may be included within a service provider network include cable networks, fiber optic networks, hybrid-fiber-cable networks, Ethernet, local area networks (LAN), metropolitan area networks (MAN), wide area networks (WAN), networks that implement the data over cable service interface specification (DOCSIS), networks that utilize asymmetric digital subscriber line (ADSL) technologies, satellite networks that send and receive data etc. Examples of wireless network technologies and networks that may be included within a service provider network include third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), high-speed downlink packet access (HSDPA), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), Bluetooth®, land mobile radio (LMR), and integrated digital enhanced network (iden). Each of these wired and wireless technologies involves, for example, the transmission and reception of data, signaling and/or content messages. Any references to terminology and/or technical details related to an individual wired or wireless communications standard or technology are for illustrative purposes only, and not intended to limit the scope of the claims to a particular communication system or technology unless specifically recited in the claim language.

The terms "user device" and "user equipment (UE)" may be used generically and interchangeably herein to refer to any one or all of satellite or cable set top boxes (STBs), laptop computers, rack mounted computers, routers, cellular telephones, smart phones, personal or mobile multi-media players, personal data assistants (PDAs), customer-premises equipment (CPE), tablet computers, smart books, palm-top computers, wireless electronic mail receivers, multimedia Internet enabled cellular telephones, wireless gaming controllers, streaming media players (such as, ROKU™), smart televisions, digital video recorders (DVRs), modems, routers, network switches, residential gateways (RG), access nodes (AN), bridged residential gateway (BRG), fixed mobile convergence products, home networking adapters and Internet access gateways that enable consumers to access communications service providers' services and distribute them around their house via a local area network (LAN), and similar electronic devices which include a programmable processor and memory and circuitry for providing the functionality described herein.

The terms "component," "system," and the like may be used herein to refer to a computer-related entity (e.g., hardware, firmware, a combination of hardware and software, software, software in execution, etc.) that is configured to perform particular operations or functions. For example, a component may be, but is not limited to, a process running on a processor, a processor, an object, an executable, a thread of execution, a program, and/or a computing device. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer-readable media having various instructions and/or data structures stored thereon. Components may communicate by way of local and/or remote processes, function or procedure calls, electronic signals, data packets, memory read/writes, and other known computer, processor, and/or process-related communication methodologies.

The term "processing system" is used herein to refer to one or more processors, including multi-core processors, that are organized and configured to perform various computing functions. Various embodiment methods may be implemented in one or more of multiple processors within a processing system as described herein.

The term "system on chip" (SoC) is used herein to refer to a single integrated circuit (IC) chip that contains multiple resources or independent processors integrated on a single substrate. A single SoC may contain circuitry for digital, analog, mixed-signal, and radio-frequency functions. A single SoC may include a processing system that includes any number of general-purpose or specialized processors (e.g., network processors, digital signal processors, modem processors, video processors, etc.), memory blocks (e.g., ROM, RAM, Flash, etc.), and resources (e.g., timers, voltage regulators, oscillators, etc.). For example, an SoC may include an applications processor that operates as the SoC's main processor, central processing unit (CPU), microprocessor unit (MPU), arithmetic logic unit (ALU), etc. An SoC processing system also may include software for controlling integrated resources and processors, as well as for controlling peripheral devices.

The term "system in a package" (SIP) is used herein to refer to a single module or package that contains multiple resources, computational units, cores or processors on two or more IC chips, substrates, or SoCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high-speed communication circuitry and packaged in close proximity, such as on a single motherboard, in a single UE, or in a single CPU device. The proximity of the SoCs facilitates high-speed communications and the sharing of memory and resources.

The term "source network address translation" (SNAT) may be used herein to refer to a network function that modifies the source Internet Protocol (IP) address in IP packet headers while they are in transit across a traffic routing device. This modification may help ensure that packets originating from multiple devices within a private network appear to be coming from a single IP address to external networks. SNAT may play an important role in facilitating outbound internet connectivity for multiple devices sharing a single public IP address, such as by conserving IP address space and enhancing privacy and security by masking internal network structures from external observation.

The term "network address port translation" (NAPT) may be used herein to refer to a specific form of SNAT that not only alters the source IP address of outbound IP packets but also modifies the source port numbers. This dual modification may allow multiple internal devices to share a single public IP address while maintaining unique session identities through port differentiation. NAPT effectively multiplexes several private IP addresses and their respective ports into a single public IP address and uses distinct port numbers to distinguish the traffic streams. NAPT may be particularly beneficial for efficiently utilizing limited public IP address resources and facilitating simultaneous internet sessions for numerous internal users or devices.

For ease of reference and to focus the discussion on the most relevant features, some of the embodiments herein are discussed with reference to SNAT. The term "SNAT" refers to the process by which the source IP address of outgoing packets from a network is altered to a different IP address (as viewed from an external network), and the term "NAPT" refers to a specific type of SNAT that also modifies the source port numbers of IP packets. In other words, while NAPT may be considered a form of SNAT, not all SNAT operations involve NAPT. As such, it should be understood that any reference to SNAT in this application, unless otherwise specified, should be understood to encompass NAPT functionalities.

The term "port set identifier" is used herein to refer to a numerical value of up to 16 bits that may be used to delineate a specific range of port numbers within a larger set. The port set identifier may provide granularity in specifying port ranges for Network Address Translation (NAT) or Network Address Port Translation (NAPT) operations. The length of the port set identifier, in bits, may be determined by the sharing ratio of the SNAT/NAPT mechanism in use. For example, a sharing ratio of 2:1 may necessitate a single bit to represent the port set identifier, whereas a 16:1 sharing ratio could require 4 bits.

The term "NAT/MAC table" is used herein to refer to a specialized data structure that associates Network Address Translation (NAT) entries with Media Access Control (MAC) addresses. The NAT/MAC table may operate as a lookup resource to facilitate efficient routing and forwarding of data packets. The table may use a 48-bit key that combines a 32-bit IPv4 address and an additional value of up to 16 bits representing the port set identifier. This key may be matched to a corresponding MAC address value, thus enabling the system to quickly identify the correct MAC address for routing purposes. The length of the port set identifier in bits may be influenced by the sharing ratio of the Source NAT/Network Address Port Translation (SNAT/NAPT), and any unused bits may be padded with zeros.

Many subscribers connect to the Internet via a customer-premise equipment (CPE) component/device. A CPE device may include a cable modem, digital subscriber line modem, router, switch, firewall, packet filter, wireless access point, and/or a residential gateway that provides network connectivity to a home or small office network. In particular, a CPE device may allow UE devices on the local area network (LAN) to connect to a wide area network (WAN) and ultimately the Internet. A CPE may include LAN ports (e.g., ports FE0-FE3, etc.) and a LAN interface for communicating with the various UE devices within the LAN. The CPE may include a WAN port (e.g., port FE4, etc.) and a WAN interface that allows the UE devices connected to the LAN to communicate with devices outside of the LAN.

The various embodiments may include or use any of a variety of modern devices, techniques, or technologies, including distributed access architecture (DAA), network address translation (NAT), carrier-grade NAT/large-scale NAT (CGN/LSN), dynamic host configuration protocol for IPv6 (DHCPv6), internet protocol version 4 (IPv4), internet protocol version 6 (IPv6), network address port translation (NAPT), user datagram protocol (UDP), transmission control protocol (TCP), internet control message protocol (ICMP), source network address translation (SNAT), remote authentication dial-in user service (Radius), cable modem (CM), data over cable service interface specification (DOCSIS), media access control (MAC), passive optical networks (XPON), such as gigabit passive optical network (GPON) and ethernet passive optical network (EPON).

Radius is a networking protocol that provides centralized authentication, authorization, and accounting (AAA) management for users who connect to a network. The dynamic host configuration protocol (DHCP) is a network management protocol used on Internet Protocol version 4 (IPv4) networks whereby a DHCP server dynamically assigns an IP address and other network configuration parameters to each UE device on the LAN so that each UE device may communicate with other Internet Protocol (IP) networks on the WAN. A CPE may include a DHCP server that enables UE devices to request IP addresses and networking parameters automatically from the service provider, thereby reducing the need for a network administrator or a user to manually assign the IP addresses to the UE devices.

Internet Protocol version 6 (IPv6) is the most recent version of the Internet Protocol (IP), the communications protocol that provides an identification and location system for computers on networks, and routes traffic across the Internet. The dynamic host configuration protocol for IPv6 (DHCPv6) is a network protocol used for configuring IPv6 hosts with IP addresses, IP prefixes, and other configuration data required to operate on an IPv6 network. DHCPv6 serves a similar function as its IPv4 counterpart. Most IPv6 capable devices support Stateless Address Auto-configuration (SLAAC), which is currently the preferred/most popular solution for disseminating interface address information to client devices.

FIG. 1 is a simplified example of a network that may be used to implement the various embodiments. In the example illustrated in FIG. 1, the network includes a subscriber layer 100, a service provider network 120, and a wide area network (WAN) 150. The subscriber layer 100 includes client devices 108, a CPE 104, and an access technology component 102 (e.g., cable modem (CM), optical network unit (ONU), optical network terminal (ONT), 4G, 5G, xG, etc.). The service provider network 120 includes a physical node component 122, traditional access termination (e.g., DSLAM, CMTS, OLT, etc.) component 124, a satellite component 126, and nodeB (gNB) 128. The WAN 150 may include multi-node access aggregation supporting NAPT environment (MNACCNAT) component 154, distributed SNAT Smart LEAF layer component 156, a provisioning infrastructure 159, and a core/Internet 162. The physical node component 122 may be communicatively coupled to a CIN or a distributed access architecture (DAA) core component in a multi-node access aggregation supporting NAPT environment (MNACCNAT) component 154 in the WAN 150.

The access technology component 102 may serve to facilitate bi-directional data communications and may include various types of devices depending on the network infrastructure. For example, in some embodiments, the access technology component 102 may include a cable modem (CM) suitable for hybrid fiber-coaxial (HFC). The CM may operate as a network bridge and enable communication via radio frequency channels. In a Passive Optical Network (PON) setting, the access technology component 102 may include an Optical Network Unit (ONU) that functions as the endpoint hardware device and may be compatible with either an Ethernet Passive Optical Network (EPON) or a Gigabit Passive Optical Network (GPON). In GPON networks, the access technology component 102 may include an Optical Network Terminal (ONT) that is directly connected to an Optical Line Terminal (OLT) and serves as a bridge between the GPON network and the user's network. In addition, the access technology component 102 may feature a Cable Modem Termination System (CMTS) deployed in a headend or hub site. The CMTS may be designed to enable high-speed communications between the CM and the elements in the service provider network 120. The service provider network 120 may include various components that facilitate consumer access to the Internet 110 or IP services via broadband connections.

The UE/CPE 104 component may function as a point of connectivity for subscribers or client devices 108 aiming to access larger networks, such as the Internet 110. The UE/CPE 104 component may be an intermediary device residing within a subscriber's premises, facilitating communication between user devices 108 (e.g., personal computers, smartphones, tablets) and external networks. The UE/CPE 104 component may include various ports and interfaces for managing both local (LAN) and external (WAN) data traffic. The UE/CPE 104 component may integrate seamlessly with the dynamic host configuration protocol (DHCP) to automatically obtain IP addresses and networking configurations.

In some embodiments, the UE/CPE 104 component may be a Stateful SNAT CPE or virtual CPE (vCPE) [CPE/vCPE]0N that is configured to operate as a routing mechanism at the subscriber location. The [CPE/vCPE]0N may be a WiFi router or combination modem/router with WiFi capabilities. In their CPE0N form, the devices may perform source network address translation (SNAT). The vCPE0N variant may represent a virtualized approach in which the routing function is shifted to the MNACCNAT0N 154, which may perform algorithmic-based SNAT operations. This architecture may accommodate 1+N number of CPEs or vCPEs and/or may provide scalable and dynamic routing capabilities.

The client devices 108 may include any of a plethora of end-user devices, such as smartphones, computers, smart televisions, and tablets, that directly interact with the service provider network 120 to access online services. The client devices 108 may be primary interfaces for users, initiating data requests and receiving information.

In some embodiments, the service provider network 120 may support a Carrier-Grade NAT or Large Scale NAT (CGN/LSN) function to facilitate effective management of IPv4 address resources. In some embodiments, the service provider network 120 may include a distributed access architecture (DAA) node that is configured for PHY-layer decentralization in access architectures. The DAA node may serve to operate as a relay, directing data between UE/CPE 104 devices and larger network systems such as the DAA core. By relocating certain conventional core functionalities closer to the user (within the confines of the service provider network 120) the DAA node may aid in the mitigation of traffic congestion, enhance data throughput, and/or create more flexible and scalable network structures. In some embodiments, the DAA core may be configured to work in coordination with DAA nodes to ensure efficient data dissemination and to perform data processing, forwarding, and management operations. The DAA core may bridge the gap between individual subscribers and vast external networks, such as the Internet 110. For example, in some embodiments, the DAA core may be configured to dynamically assign IP addresses, route optimization, manage NAT/MAC forwarding tables, and perform other similar operations to ensure seamless high-speed data exchange for all connected entities.

In some embodiments, the MNACCNAT0N 154 component may serve to operate as one of the multi-node entities that provide or support NAPT functionalities. Each node in this multi-node environment may be capable of handling one or more unique instances of a shared NAPT address. For example, one node may manage NAPT for the address 192.0.2.1 PSID 1, 2, and 3, and another may handle it for address 192.0.2.1 PSID 12 and 13. In some embodiments, these nodes may be integral parts of a DAA core or form nodes within a distributed implementation of a Broadband Network Gateway (BNG). The NAPT function may be executed directly on these nodes or supported externally, especially in scenarios involving subscriber-proximate devices such as CPEs. These nodes may be deployed within a Kubernetes cluster environment or another distributed system or environment.

In some embodiments, the distributed SNAT smart LEAF layer component 156 may include a distributed NAT LEAF switch (DNLEAF0N) that is configured to operate as the attachment point for MNACCNAT0N 154. The DNLEAF0N may incorporate a mechanism for receiving IPv4 route advertisements from atomic data plane objects within a particular MNACCNAT0N 154. The route advertisements may include an IPv4 address and a port range identifier. These advertisements may enable the DNLEAF0N to construct a mapping table that includes a next-hop IPv4 address (e.g., unique per Node/atomicObj) for each applicable atomic object. This may in turn facilitate the DNLEAF0N's capability to direct Core/Internet 162 source traffic accurately to the respective MNACCNAT0N/atomicObj. This process may be executed via an ASIC (or other custom network processing optimized hardware) based layer-2 address re-write. The architecture may allow for the deployment of 1+N number of DNLEAF0Ns for robust scalability and efficient traffic management.

It should be understood that the terms DNLEAF0N and MNACCNAT0N are used for ease of reference, to emphasize the cloud-native characteristics of some embodiments, and to signify the system's capacity to support 1+N instances of these functions. Consequently, it should be understood that the systems described above may support the deployment of multiple DNLEAFs, MNACCNATs, etc.

The provisioning infrastructure 159 may include DHCP4/DHCPv6, ACS, Radius, or other provisioning components configured for the efficient allocation of network resources. These components may be configured to assign IPv4/IPv6 addresses or prefixes to subscribers. These components may also assign other metadata, which may be specific to individual users or common across a subscriber group.

In some embodiments, the provisioning infrastructure 159 may include components configured to operate as a provisioning manager to manage the automatic allocation of network resources to UE/CPE 104 devices and ensure that user client devices 108 quickly and efficiently obtain the appropriate resources. The provisioning components may authenticate, authorize, and assign relevant networking parameters when a UE/CPE 104 component initiates a connection request. The provisioning components may include a centralized database that includes customer profiles and service entitlements and/or may operate as the central reference point to ensure consistency and accuracy in provisioning decisions. The provisioning component may be configured to provide answers to queries that arise about a client device's eligibility or any configuration-related issue. The provisioning component may maintain a comprehensive and up-to-date database of provisioning policies, configurations, and subscriber entitlements, and may be configured to ensure that network resources are allocated judiciously.

The core/internet 162 components may include network components that create the vast expanse of interconnected networks known as the Internet 110. The core/internet 162 may be the ultimate destination for most of the data requests initiated by end-users. Whether a user client device 108 is streaming a video, browsing a webpage, or sending an email, the requested data typically traverses from this vast network through the service provider's infrastructure, eventually reaching the client device 108. Efficient interaction between DAA core and core/internet 162 components may help ensure that users access the limitless resources of the Internet with minimal delay and maximum efficiency.

Figure 2:
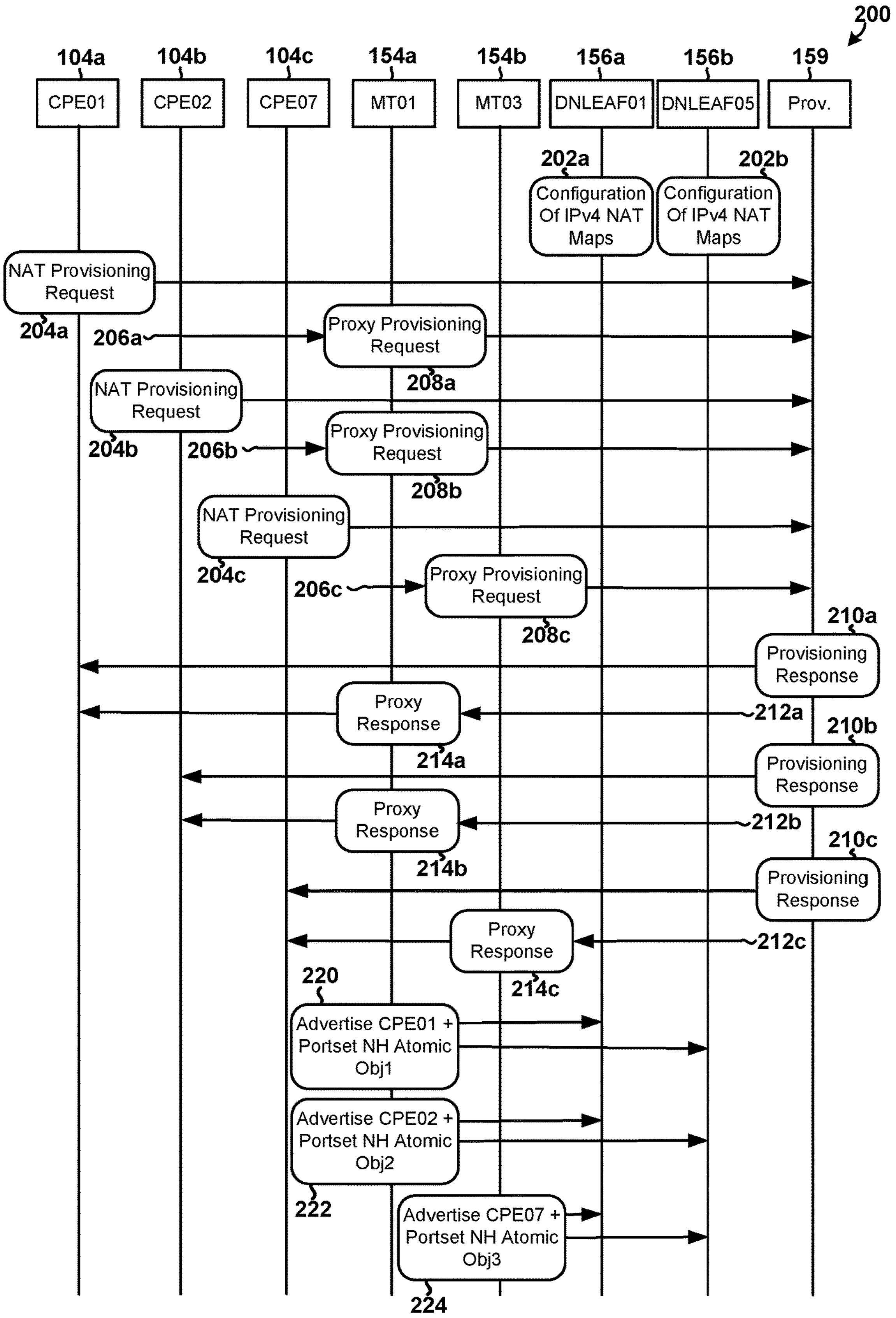
FIG. 2 is a process flow diagram illustrating a control plane method for dynamic routing and provisioning in distributed computing environments that include customer premise equipment (CPEs).

FIG. 2 is a process flow diagram illustrating a control plane method 200 for dynamic routing and provisioning in distributed computing environments that include CPEs in accordance with some embodiments. Method 200 may be performed by processors in one or more network components (e.g., any or all of the components discussed above with reference to FIG. 1). The system illustrated in FIG. 2 may accommodate fluctuating network loads and support complex network operations, such as DDoS mitigation. The system may enhance scalability, flexibility, and security in data forwarding, provide a robust defense against network threats, and help ensure consistent connectivity across various network nodes.

In operation blocks 202*a* and 202*b*, processors in distributed SNAT smart LEAF layer components DNLEAF01 156*a* and DNLEAF05 156*b* may establish and maintain network address translation (NAT) mappings for IPv4 addresses and/or perform other operations to ensure that each device on the internal network may establish outbound connections to the internet in a manner that conserves the limited IPv4 address space and/or provides a level of security (e.g., by hiding internal IP addresses from external networks, etc.).

For example, in operation block 202*a*, a processor in DNLEAF01 156*a* may identify IPv4 prefixes designated for SNAT. The processor may determine, for each NAT IPv4 prefix pool, the procedure for extracting the PSID that matches a given destination port value on an incoming packet. This functionality may allow the DNLEAF01 156*a* to determine the BGP address and PSID advertisement that should be selected for a particular packet, intended for SNAT/NAPT further along the network path. In operation block 202*b*, a processor in DNLEAF05 156*b* may perform the same or similar operations discussed above to identify IPv4 prefixes for SNAT.

It should be understood that, in some embodiments, the DNLEAF may be configured to identify the appropriate BGP address and PSID for packets based on their destination port.

In operation block 204*a*, a processor in CPE01 104*a* may initiate a NAT Provisioning Request. For example, the processor may send a signal to request the allocation of network address translation parameters necessary for a customer premises equipment (CPE) to communicate with external networks, such as the Internet. This may allow the CPE to convert private IP addresses from within a local network to a public IP address for outgoing traffic. In operation blocks 204*b* and 204*c*, processors in CPE02 104*b* and CPE07 104*c* may perform the same operations discussed above with reference to operation block 204*a*.

In operation 206*a*, the system may send the NAT provisioning request from CPE01 104*a* to a MNACCNAT component MT01 154*a*.

In operation 206*b*, the system may send a NAT provisioning request from CPE02 104*b* to the MT01 154*a*.

In operation 206*c*, the system may send a NAT provisioning request from CPE07 104*c* to another MT component 154*b*.

In operation block 208*a*, a processor in the MNACCNAT component MT01 154*a* may receive the NAT provisioning request from CPE01 104*a*.

In operation block 208*b*, the processor in MT01 154*a* may receive the NAT provisioning request from CPE02 104*b* and issue a proxy provisioning request to the provisioning 159 component.

In operation block 208*c*, the processor in MT02 154*b* may receive the NAT provisioning request from CPE07 104*c* and issue a proxy provisioning request to the provisioning 159 component.

In operation blocks 210*a*, 210*b*, and 210*c*, the provisioning 159 components may send provisioning responses to a MNACCNAT function (e.g., MT01 154*a*, MT02 154*b*, etc.), which may in turn relay these responses to CPE01 104*a*, CPE02 104*b*, and CPE07 104*c*, respectively. Thus, the provisioning 159 components may send provisioning responses to CPE01 104*a*, CPE02 104*b*, and CPE07 104*c*, respectively. This may provide the CPEs with the necessary NAT parameters and allow the CPEs to communicate with external networks.

In operation block 212*a*, the system may process the provisioning response for CPE01 104*a* through the MNACCNAT component MT01 154*a*. This operation may include the MT01 154*a* receiving the provisioning response and executing a proxy provisioning operation. Said another way, the MT01 154*a* may operate as a proxy responsible for relaying the provisioning response from the originator to the intended destination (i.e., the provisioning system itself in this example) and then to CPE01 104*a*. The proxy operation within MT01 154*a* may include extracting from the communications metadata used by the MNACCNAT function to calculate and generate the routes advertised in 220, 222, and 224.

In operation block 212*b*, the system may similarly process the provisioning response for CPE02 104*b* through the MNACCNAT component MT01 154*a*. The proxy operation, as executed by MT01 154*a*, may validate and authenticate the provisioning response to, for example, help ensure that the network configurations are securely updated in accordance with the system's security protocols.

In operation block 212*c*, the system may process the provisioning response for CPE07 104*c* through another MNACCNAT component, MT03 154*b*. This proxy operation may help ensure that the provisioning responses are subjected to the necessary security and authentication checks.

In operation blocks 214*a* and 214*b*, MT01 154*a* may send a proxy response to CPE01 104*a* and CPE02 104*b*, respectively. In operation block 214*c*, MT03 154*b* may send a proxy response to CPE07 104*c*. These operations may signal the completion of the proxy process and/or confirm that the network configurations for CPE02 104*b* and CPE07 104*c* have been securely updated.

In operation block 220, a processor in MT01 154*a* may advertise the presence of CPE01 104*a* by IPv4 address plus a portset and IPv4 next hop atomic object (Atomic Obj1) to DNLEAF01 156*a* and DNLEAF05 156*b*. Thus, the advertisement may indicate the presence of CPE01 104*a*, the IPv4 address associated with CPE01 104*a*, the portset, and the IPv4 next hop atomic object.

In operation block 220, a processor in MT01 154*a* may advertise the presence of CPE01 104*a* by IPv4 address plus a portset and IPv4 next hop atomic object (Atomic Obj2) to DNLEAF01 156*a* and DNLEAF05 156*b*. In some embodiments, the processor may broadcast a message indicating the operational status of CPE01 104*a* and the availability of specific network ports (e.g., for routing traffic, etc.) and/or inform the network about the capacity and specific network paths that are available for routing traffic through CPE01 104*a*.

In block 222, the processor in MT01 154*a* may advertise the presence of CPE02 104*b* plus a portset next hop atomic object (Atomic Obj2) to DNLEAF01 156*a* and DNLEAF05 156*b*.

In block 224, a processor in MT03 154*b* may advertise the presence of CPE07 104*c*, also by IPv4 address plus a portset and IPv4 next hop atomic object (Atomic Obj3) to DNLEAF01 156*a* and DNLEAF05 156*b*.

Figure 3:
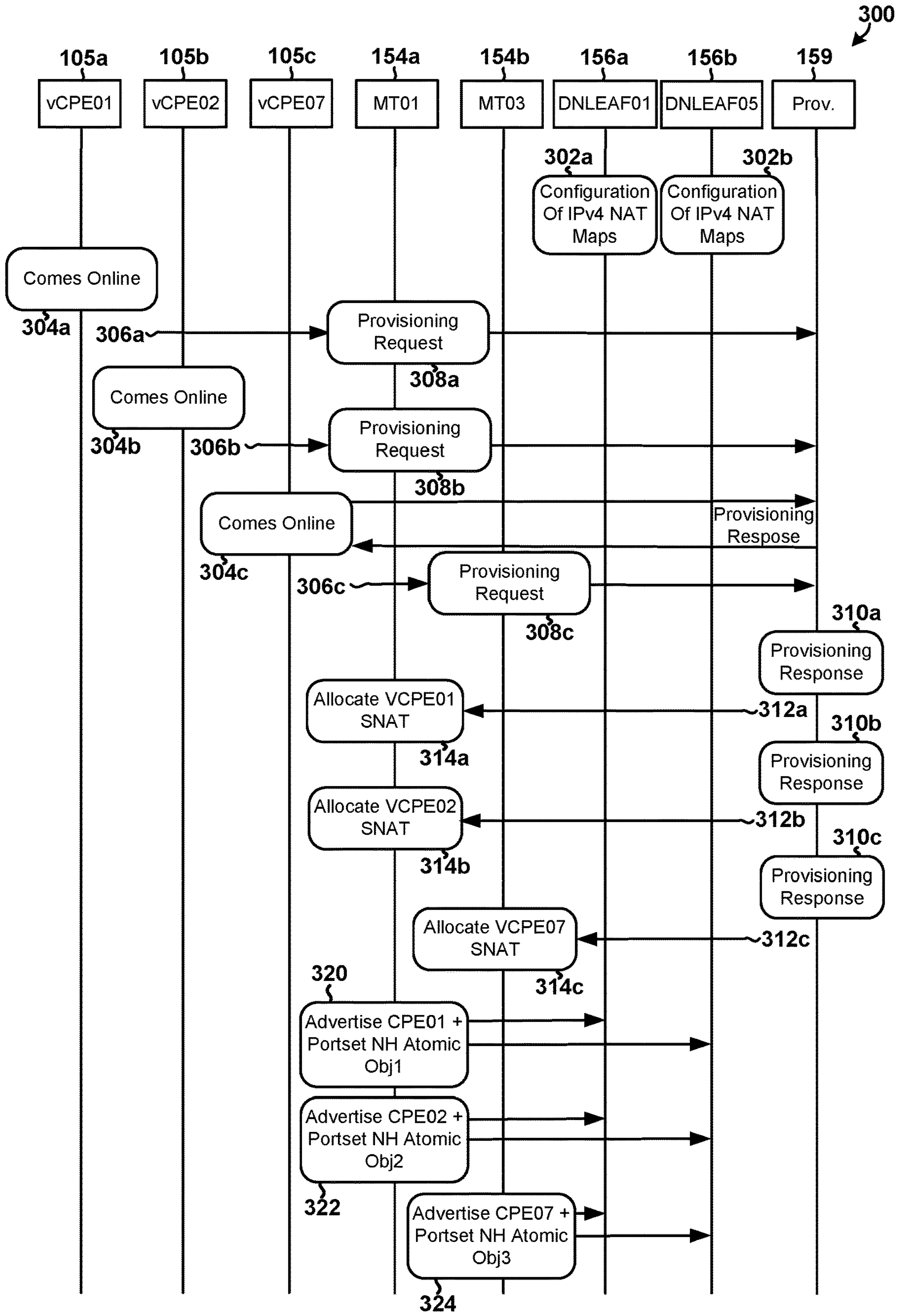
FIG. 3 is a process flow diagram illustrating a control plane method for dynamic routing and provisioning in distributed computing environments that include virtual CPEs (vCPEs).

FIG. 3 is a process flow diagram illustrating a control plane method 300 for dynamic routing and provisioning in distributed computing environments that include virtual CPEs (vCPEs) in accordance with some embodiments. Method 300 may be performed by processors in one or more network components (e.g., any or all of the components discussed above with reference to FIGS. 1 and 2) to help ensure that each vCPE receives the necessary provisioning to function adequately within the network framework.

Method 300 may improve the performance and functioning of the network by establishing NAT mappings for IPv4, facilitating seamless internet access, allowing vCPEs to function as virtual routers, and ensuring that each vCPE is properly provisioned. Unlike traditional setups, the vCPEs may bridge LAN and WLAN traffic to the MNACCNAT, simplifying the network infrastructure at subscriber locations and centralizing provisioning data management. Method 300 may efficiently adapt to and/or support various different connectivity scenarios and technologies (e.g., direct Ethernet, PPPoE sessions, common access technologies, etc.).

In operation blocks 302*a* and 302*b*, processors in DNLEAF01 156*a* and DNLEAF05 156*b* may establish and maintain NAT mappings for IPv4 addresses and/or perform other operations to ensure that each device on the internal network may establish outbound connections to the internet.

In operation blocks 304*a*, 304*b*, and 304*c*, vCPE01 105*a*, vCPE02 105*b*, and vCPE07 105*c* come online. That is, unlike traditional CPE in which full router functionality resides on-premises, a vCPE may operate as a conduit that bridges LAN and WLAN traffic to the MNACCNAT, which may, in turn, operate as a virtual router and/or perform the dynamic provisioning and management of network services traditionally associated with physical routers at the customer's location.

The process of a vCPE becoming operational or "Coming Online" may include several distinct scenarios, each with implications for how network services are provisioned and managed. As an example, in a direct ethernet connectivity scenario, the vCPE may establish connectivity through a direct Ethernet link. Upon activation, the Ethernet connection may trigger the setup towards an access network, which may (e.g., through VLAN technologies, etc.) uniquely identify the traffic at the WAG or BNG level. This identification may lead to a provisioning request, similar to the process used by traditional gateways for obtaining addressing and other network services. In this example, the MNACCNATON (acting as WAG/BNG) may be responsible for delivering DHCPv4/DHCPv6, DNS, IPv6 SLAAC support, and NAPT services to the LAN/WLAN devices.

As another example, in a Point-to-Point Protocol over Ethernet (PPPoE) session initiation scenario, the subscriber premise device may initiate a PPPoE session that, in turn, establishes a unique session with the BRAS, WAG, or BNG and prompts a similar upstream provisioning request process as traditional gateways. Consequently, the MNACCNAT0N may provide essential network services, including DHCPv4/DHCPv6, DNS, IPv6 SLAAC support, and NAPT, to the devices connected to the LAN/WLAN.

A common access technology connection scenario may apply when the vCPE utilizes standard access technologies such as DOCSIS, Ethernet, or Passive Optical Network (PON). The device may initiate a provisioning request to acquire layer-3 connectivity and data to establish a tunnel session (using protocols like GRE, L2TPv3) to the WAG or BNG. The establishment of this tunnel session may trigger the WAG or BNG to perform upstream provisioning, similar to the process performed by traditional gateways. The MNACCNAT0N, may be responsible for provisioning the DHCPv4/DHCPv6, DNS, IPv6 SLAAC support, and NAPT to the LAN/WLAN devices.

In the above example scenarios, the vCPE may serve as an intermediary, facilitating the transition from local network traffic to the service provider network, with the MNACCNAT0N acting as the pivotal 'virtual router.' This setup simplifies the physical infrastructure at the subscriber's premises and introduces flexibility and efficiency in managing network connectivity and services. The provisioning responses discussed in the example illustrated in FIG. 3 are particularly relevant in the common access technology connection scenario in which the vCPE initiates direct provisioning requests for layer-3 connectivity. However, it should be understood that the dynamics of provisioning and connectivity may vary based on the specific operational context and the network architecture in place.

In operation 306*a*, a processor or an intermediary access switch connecting vCPE01 105*a* may enforce a unique VLAN tag on the port basis for vCPE01. This unique identifier may allow the MNACCNAT component MT01 154*a* to distinguish between sessions originating from different vCPEs and avoid using an IPv4/IPv6 tunnel or layer 2 tunnel session, relying instead on a more passive identification mechanism that enhances session differentiation. The MNACCNAT function may be configured to process traditional user equipment (UE) based provisioning operations (e.g., DHCP, etc.) for entities connected to the LAN/WLAN side of the vCPE01. In some embodiments, these or similar operations may be performed for vCPE02 and vCPE07, which may help ensure uniform handling across different vCPE instances within the network. It should be understood that the MNACCNAT component MT01 154*a* may not be able to service UE requests until 314*a*.

In operation 306*b*, a processor in vCPE02 105*b* may send a provisioning request to MT01 154*a*. In some embodiments, the vCPE02 105*b* may initiate a connection to MT01 154*a* using the Point-to-Point Protocol over Ethernet (PPPoE), which may be used to authenticate the vCPE02 endpoint and create a unique virtual identifier within the MNACCNAT for this specific endpoint. PPPoE may help facilitate a more structured negotiation process in which parameters such as authentication credentials, maximum packet size, and compression options are determined.

In operation block 306*c*, the vCPE07 105*c*, through its processor, may initiate a request to MT03 154*b* for setting up a layer-3 tunnel using protocols such as generic routing encapsulation (GRE) or layer 2 tunneling protocol version 3 (L2TPv3) to establish a direct connection to its designated MNACCNAT (and authenticate the tunnel, etc.). This request may facilitate establishing a secure network passage without necessitating direct interaction with the MNACCNAT, allowing the location of the MNACCNAT within the network to be flexible as long as layer-3 connectivity is available. In some embodiments, the provisioning process may include two primary tasks: assigning a layer-3 address and the necessary metadata to vCPE07 for initiating contact with its MNACCNAT, followed by establishing a direct communication session using the outlined protocols.

Subsequent operations in blocks 308*a*, 308*b*, and 308*c* may include the MT01 154*a* (or MT03 154*c*, etc.) executing tasks tailored to meet the specific provisioning needs of each vCPE instance. This may include directing provisioning requests to specialized components or managing these tasks within an internal framework, using techniques and technologies similar to those used in control and user plane separation (CUPS)-enabled broadband network gateway (BNG) setups. The operations may include configuring unique addressing schemes for the vCPEs, which may include determining IPv6 addresses, prefixes, a public IPv4 address, a PSID, and/or information necessary to compute the PSID for the vCPE instances.

It should be understood that the provisioning operations for the vCPE instance may be separate and distinct from the inline MNACCNAT role in initial address provisioning and/or separate and distinct from potential inline proxying of the initial address provisioning request. That is, method 300 may separate and delineate the provisioning activities for vCPEs from the initial network address assignment, which may, in turn, allow for centralizing the control and handling of provisioning data and/or streamlining the provisioning operations.

It should be understood that unlike the specific context described for vCPE07 105*c* in operation 306*c*, the provisioning responses in operation blocks 310*a*, 310*b*, and 310*c* are not sent directly to vCPE07 105*c*.

In operation blocks 312*a*, 312*b*, and 312*c*, the processors in the provisioning 159 components may generate unique provisioning data for each corresponding vCPE instance. Instead of sending the generated provisioning data directly to the vCPEs, the processors may send the data to the respective MNACCNAT components (i.e., MT01 154*a* for vCPE01 105*a* and vCPE02 105*b*, and MT03 154*b* for vCPE07 105*c*). The MNACCNAT components may receive and use the provisioning data to instantiate operational profiles on behalf of each vCPE. Thus, rather than being directly processed by the vCPEs, the actual provisioning data for the operational setup of the vCPEs may be managed and applied through the MNACCNAT components rather than being directly processed by the vCPEs themselves. The MNACCNAT components may operate as a central point for the interpretation, generation, and application of the provisioning data. Consequently, the relevant MNACCNAT instance may assume the role of a virtual router and provide any or all of the traditional functions associated with a traditional on-premises subscriber router.

In operation block 314*a*, a processor in MT01 154*a* may allocate vCPE01 105*a* SNAT. In operation block 314*b*, a processor in MT01 154*a* may allocate vCPE02 105*b* SNAT. In operation block 314*c*, a processor in MT03 154*b* may allocate vCPE07 105*c* SNAT.

In operation block 320, a processor in MT01 154*a* may advertise the presence of CPE01 104*a* plus a portset next hop atomic object (Atomic Obj1) to DNLEAF01 156*a* and DNLEAF05 156*b*. In operation block 322, the processor in MT01 154*a* may advertise the presence of CPE02 104*b* plus a portset next hop atomic object (Atomic Obj2) to DNLEAF01 156*a* and DNLEAF05 156*b*. In operation block 324, a processor in MT03 154*b* may advertise the presence of CPE07 104*c* plus a portset next hop atomic object (Atomic Obj3) to DNLEAF01 156*a* and DNLEAF05 156*b*.

Figure 4:
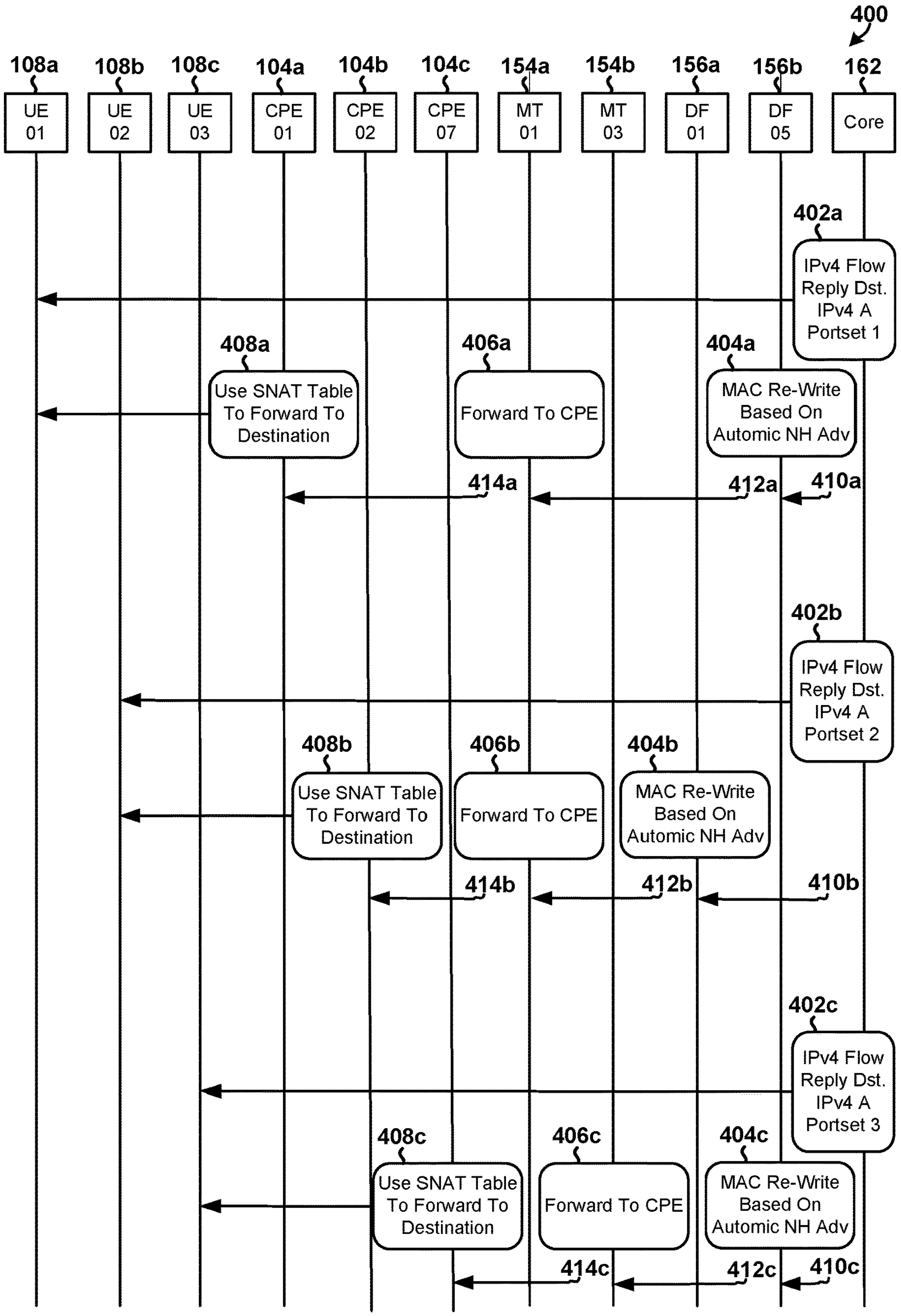
FIG. 4 is a process flow diagram illustrating a data plane method for dynamic routing and provisioning in distributed computing environments that include CPEs.

FIG. 4 is a process flow diagram illustrating a data plane method 400 for dynamic routing and provisioning in distributed computing environments that include CPEs in accordance with some embodiments. Processors in network components may perform method 400 to help ensure efficient packet flow and service provisioning across the network.

In operation block 402*a*, the core 162 component may manage traffic originally generated by an external IPv4 Internet endpoint. This traffic may be directed toward a specific IPv4 address and a defined set of network ports (IPv4 Flow Reply Dst. IPv4 A Portset 1) directed toward UE 01 108*a*. This traffic may constitute a response to an initial packet that UE 01 108*a* had previously sent out.

In operation block 402*b*, traffic within the core 162 component, originating from an external IPv4 Internet endpoint, is directed toward a specific IPv4 address with a distinct set of network ports (IPv4 Flow Reply Dst. IPv4 A Portset 2), reaching UE 02 108*b*. This traffic serves as a reply to an initial packet dispatched by UE 02 108*b*.

In operation block 402*c*, traffic passing through the core 162 component, initially originated by an external IPv4 Internet endpoint, is directed toward a specific IPv4 address associated with another set of network ports (IPv4 Flow Reply Dst. IPv4 A Portset 3), reaching UE 03 108*c*. This routing action is in direct response to an initial packet previously transmitted by UE 03 108*c*.

In operations 410*a*, 410*b*, and 410*c*, packets traverse the core 162 component, reflecting data plane forwarding logic. These operations illustrate the movement of packets to DNLEAF05 (DF05) 156*b* and DNLEAF01 (DF01) 156*a*, respectively. The process may be governed by traditional IPv4 routing principles and/or established routing protocols or traffic engineering practices, focusing solely on the destination IPv4 address for routing decisions. It should be noted that that this routing activity does not engage with control plane operations, such as atomic next hop advertisements, nor does it rely on the explicit advertisement of PSIDs. The routers may be configured to disregard whether the destination address is part of a shared system supported by DNLEAF05 (DF05) 156*b* and DNLEAF01 (DF01) and implement a traditional approach to IPv4 routing without depending on PSID-related advertisements.

In operation blocks 404*a*, 404*b*, and 404*c*, a processor within DF05 156*b* and DF01 156*a* may update the MAC addresses for network packets based on the atomic next hop advertisement. The atomic next hop advertisement may be identified by matching each packet's IPv4 destination address with its Port Set Identifier (PSID). The PSID may be identified by performing port mapping operations that include applying the packet destination port and relevant integers (e.g., ICMPv4 echo and echo reply identifiers, etc.) to a port mapping algorithm that operates in accordance with the configuration specified in IPv4 NAT Maps to perform a series of mask operations that identify the specific bits that constitute the PSID.

In operations 412*a*, 412*b*, and 412*c*, one or more processors within the DNLEAFs may oversee the transition of packets from the DNLEAFs to the MNACCNAT. The routing decisions may rely on the layer-2 table, such as a MAC table within the DNLEAF, to determine the correct route for packet forwarding.

In operation blocks 406*a* and 406*b*, a processor in MT01 154*a* may identify and route packets to their designated customer premises equipment, CPE01 104*a* and CPE02 104*b*, respectively. Similarly, in operation block 406*c*, the processor in MT03 154*b* may perform the same or similar task for CPE07 104*c*. To streamline the explanation and maintain focus on key aspects without delving into the complexities of all potential routing scenarios, the specific methods used to direct packets to the appropriate customer premises equipment (CPE) are not discussed in detail. It should be understood that the approach for identifying the correct CPE destination is contingent on the particular technologies deployed within the MNACCNAT system. This might involve MAC address rewriting techniques or configurations found in broadband remote access servers (BRAS), wireless access gateways (WAG), and broadband network gateways (BNG), which are capable of differentiating between CPE and non-CPE traffic. The intricacies of these methodologies are considered implementation specifics that vary according to the network's architectural design, and should not be used to limit the specification or claims unless expressly recited as such in the body of the claims.

In operations 414*a*, 414*b*, and 414*c*, one or more processors may facilitate the forwarding of network traffic to the respective CPE. These operations may align with the underlying considerations previously discussed, ensuring that network packets reach their intended CPE destinations efficiently. The routing mechanisms may use the network's infrastructure to direct the flow of data according to established protocols and configurations to maintain seamless connectivity and communication across the network.

In operation block 408*a*, a processor in CPE01 104*a* may use a SNAT table to forward the packets to the destination UE01 108*a*. In operation block 408*b*, a processor in CPE02 104*b* may use a SNAT table to forward the packets to the destination UE02 108*b*. In operation block 408*c*, a processor in CPE07 104*c* may use a SNAT table to forward the packets to the destination UE03 108*c*.

Figure 5:
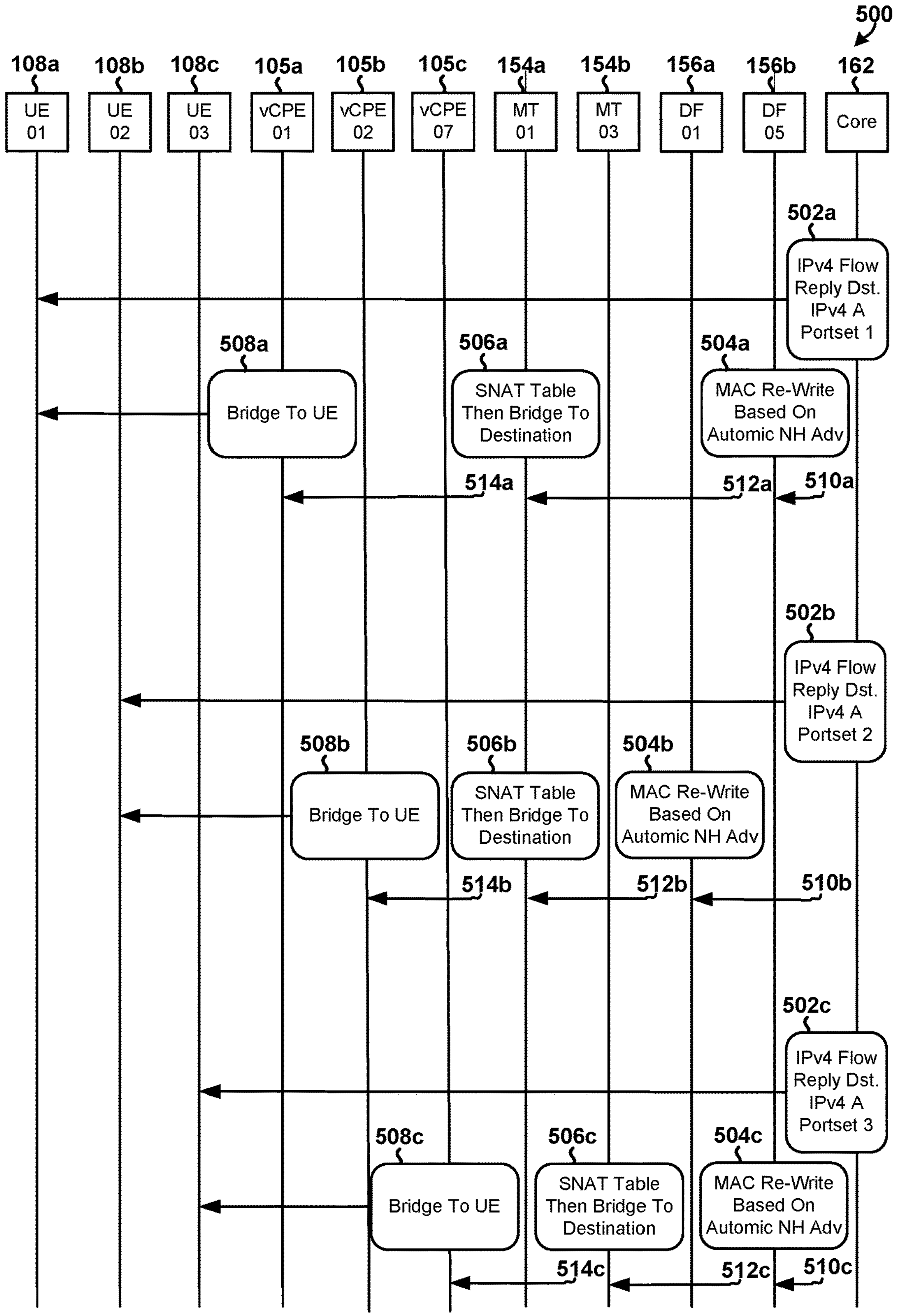
FIG. 5 is a process flow diagram illustrating a data plane method for dynamic routing and provisioning in distributed computing environments that include vCPEs.

FIG. 5 is a process flow diagram illustrating a data plane method 500 for dynamic routing and provisioning in distributed computing environments that include vCPEs in accordance with some embodiments. Processors in network components may perform method 500 to better manage network traffic originating from external IPv4 internet endpoints as it traverses the network core to its designated user equipment.

In operations blocks 502*a*, 502*b*, and 502*c*, traffic that originates from external IPv4 internet endpoints and passes through the core 162 component may be directed towards specific UEs. In the illustrated example, this traffic heads towards UE01 108*a* at a designated IPv4 address with a set of network ports (IPv4 Flow Reply Dst. IPv4 A Portset 1), towards UE02 108*b* at a different IPv4 address with another set of ports (IPv4 Flow Reply Dst. IPv4 A Portset 2), and towards UE03 108*c* at yet another IPv4 address with a distinct set of network ports (IPv4 Flow Reply Dst. IPv4 A Portset 3), respectively. The traffic represents replies to initial packets previously sent out by each corresponding UE (i.e., UE01 108*a*, UE02 108*b*, and UE03 108*c*). Thus, the core 162 component's role involves managing and directing these response packets through the network infrastructure and ensuring they reach their intended UE destinations. It should be understood that this traffic is not generated by the core 162 processor but is managed as it moves through the network infrastructure.

In operations blocks 504*a*, 504*b*, and 504*c*, the processors may perform the same or similar operations as illustrated and described above with reference to operations blocks 404*a*, 404*b*, and 404*c* of FIG. 4.

In operations 510*a*, 510*b*, and 510*c*, packets traverse the core 162 component, directed towards DNLEAF DF05 156*b* and DNLEAF DF01 156*a*. The operations reflect the data plane forwarding function and include routing packets through to the designated DNLEAF switches based on the existing network configuration.

In operations 512*a*, 512*b*, and 512*c*, one or more processors facilitate the traversal of packets from the DNLEAF to the MNACCNAT. These operations may be guided by the layer-2 forwarding decisions, typically determined by a MAC address table within the DNLEAF, routing the packets to their appropriate next destination within the network architecture.

In operation block 506*a*, a processor in MT01 154*a* may use a SNAT table and then bridge to destination vCPE01 105*a* through a specific link or interface as part of traditional bridging operations. In operation block 506*b*, a processor in MT01 154*a* may use a SNAT table and then bridge to destination vCPE02 105*b* through the correct PPPoE instance. In operation block 506*c*, a processor in in MT03

154*b* may use a SNAT table and then bridge to destination vCPE07 105*c* through the appropriate tunneling instance, such as GRE or L2TPv3.

In operations 514*a*, 514*b*, and 514*c*, one or more processors may facilitate the final traversal of traffic across respective bridging technologies towards the designated vCPE. In some embodiments these operations may include directing the traffic through the appropriate link or interface (e.g., a traditional bridging operation, a PPPoE instance, a specific tunneling protocol like GRE or L2TPv3, etc.) to help ensure that each packet reaches its intended vCPE destination.

In operation block 508*a*, a processor in vCPE01 105*a* may bridge to UE01 108*a*. In operation block 508*b*, a processor in vCPE02 105*b* may bridge to UE02 108*b*. In operation block 508*c*, a processor in vCPE07 105*c* may bridge to UE03 108*c*.

Figure 6:
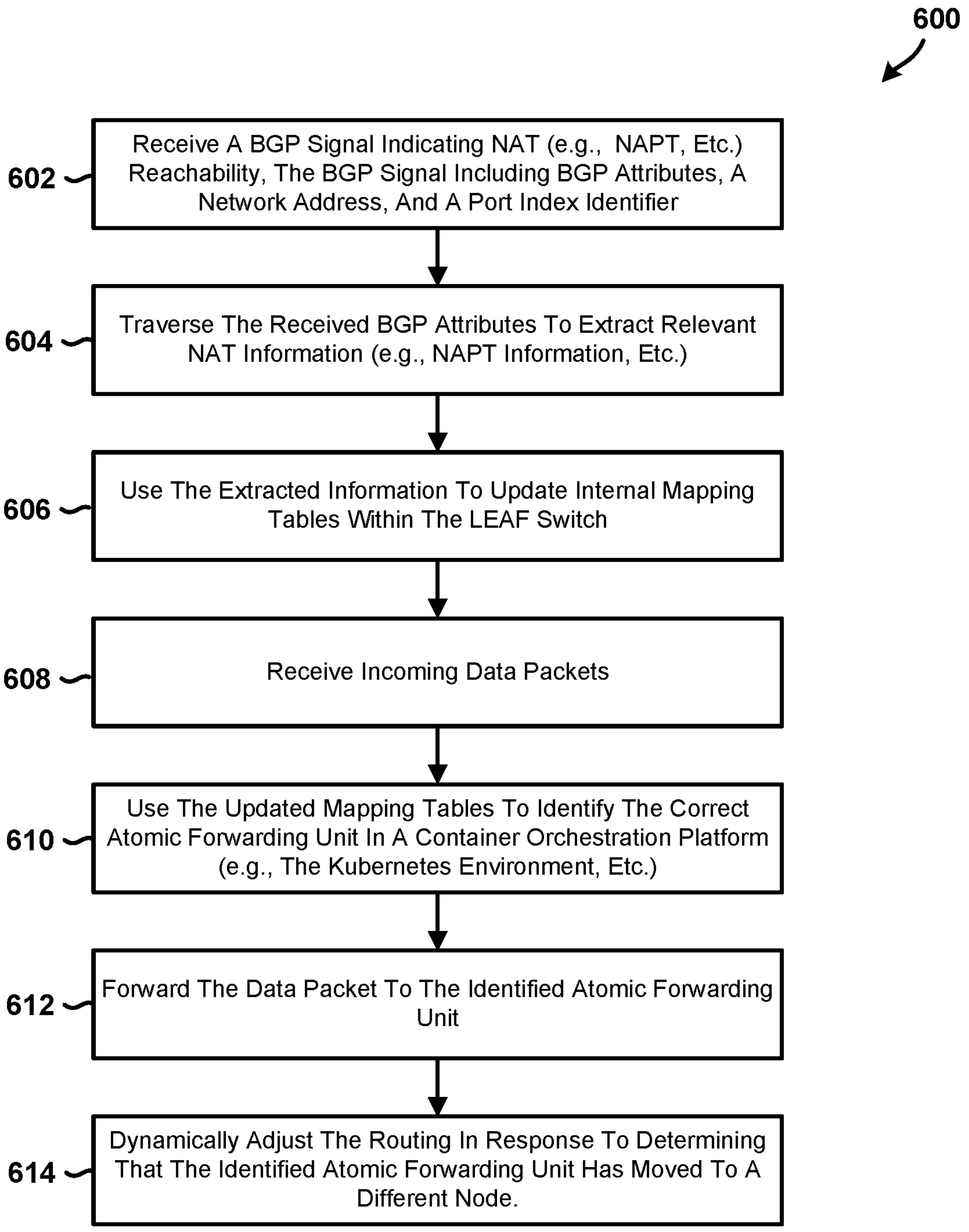
FIG. 6 is a process flow diagram illustrating a method of signaling the reachability of network addresses combined with port index identifiers in accordance with some embodiments.

FIG. 6 illustrates a method 600 of signaling the reachability of network addresses combined with port index identifiers in accordance with some embodiments. Method 600 may be performed by one or more processors or processing systems in a network computing system. For example, in some embodiments, method 600 may be performed by a processor in a LEAF switch.

In block 602, the processor may receive a BGP signal indicating NAT (e.g., NAPT, etc.) reachability, the BGP signal including BGP attributes, a network address, and a port index identifier.

In block 604, the processor may traverse the received BGP attributes to extract relevant NAT information (e.g., NAPT information, etc.).

In block 606, the processor may use the extracted information to update internal mapping tables within the LEAF switch.

In block 608, the processor may receive incoming data packets.

In block 610, the processor may use the updated mapping tables to identify the correct atomic forwarding unit in a container orchestration platform (e.g., the Kubernetes environment, etc.).

In block 612, the processor may forward the data packet to the identified atomic forwarding unit.

In block 614, the processor may dynamically adjust the routing in response to determining that the identified atomic forwarding unit has moved to a different node.

Figure 7:
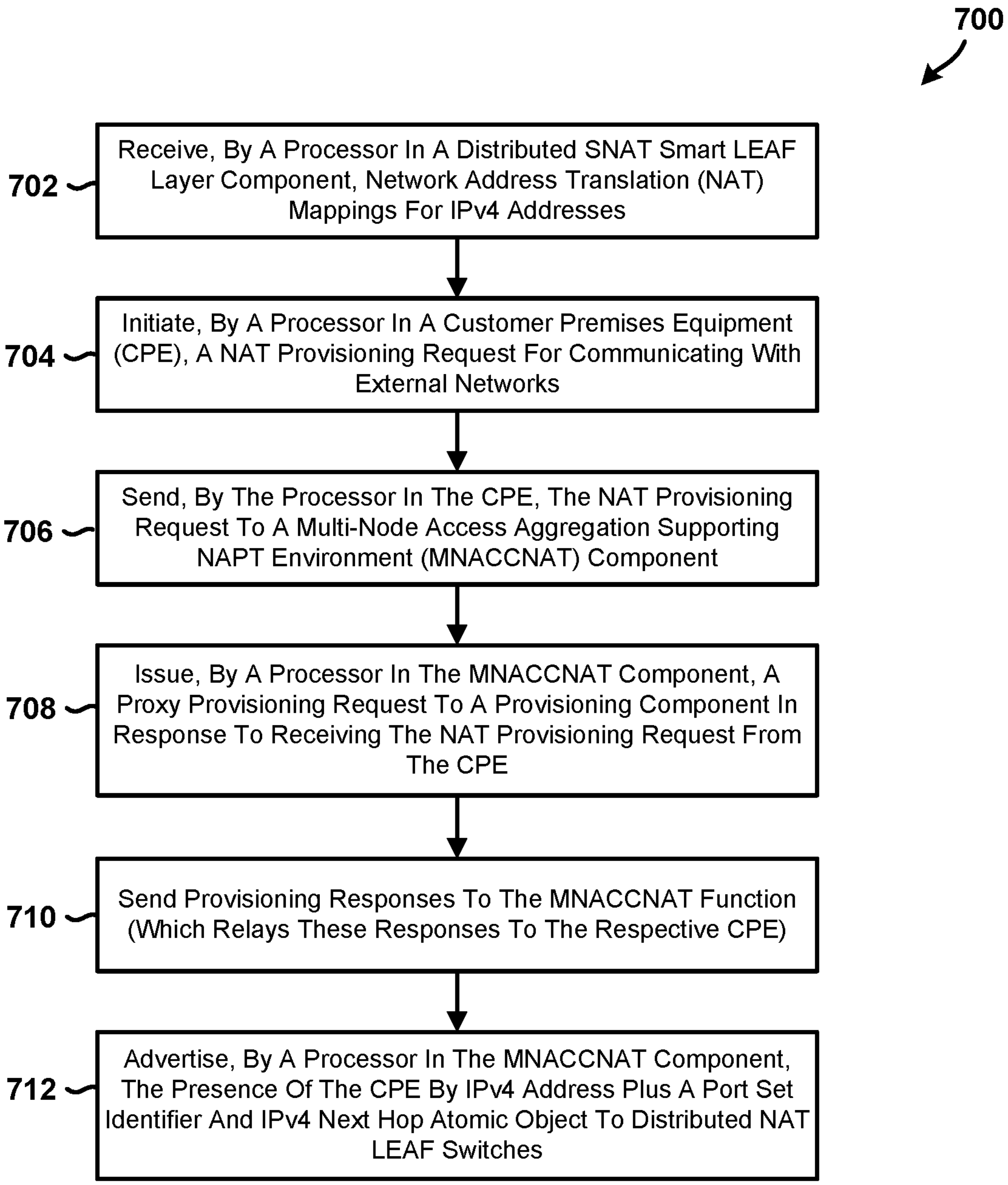
FIG. 7 is a process flow diagram illustrating a method of routing and provisioning in a distributed computing system through dynamic source network address translation (SNAT) in accordance with some embodiments.

FIG. 7 illustrates a method 700 of routing and provisioning in a distributed computing system through dynamic source network address translation (SNAT) in accordance with some embodiments. Method 700 may be performed by one or more processors or processing systems in a network computing system.

In block 702, a processor in a distributed SNAT smart LEAF layer component may receive network address translation (NAT) mappings for IPv4 addresses.

In block 704, a processor in a customer premises equipment (CPE) may initiate a NAT provisioning request for communicating with external networks.

In block 706, the processor in the CPE may send the NAT provisioning request to a multi-node access aggregation supporting NAPT environment (MNACCNAT) component.

In block 708, a processor in the MNACCNAT component may issue a proxy provisioning request to a provisioning component in response to receiving the NAT provisioning request from the CPE.

In block 710, a processor may send provisioning responses to the MNACCNAT function, which may relay these responses to the respective CPE.

In block 712, a processor in the MNACCNAT component may advertise the presence of the CPE by IPv4 address plus a port set identifier and IPv4 next hop atomic object to distributed NAT LEAF switches.

Figure 8:
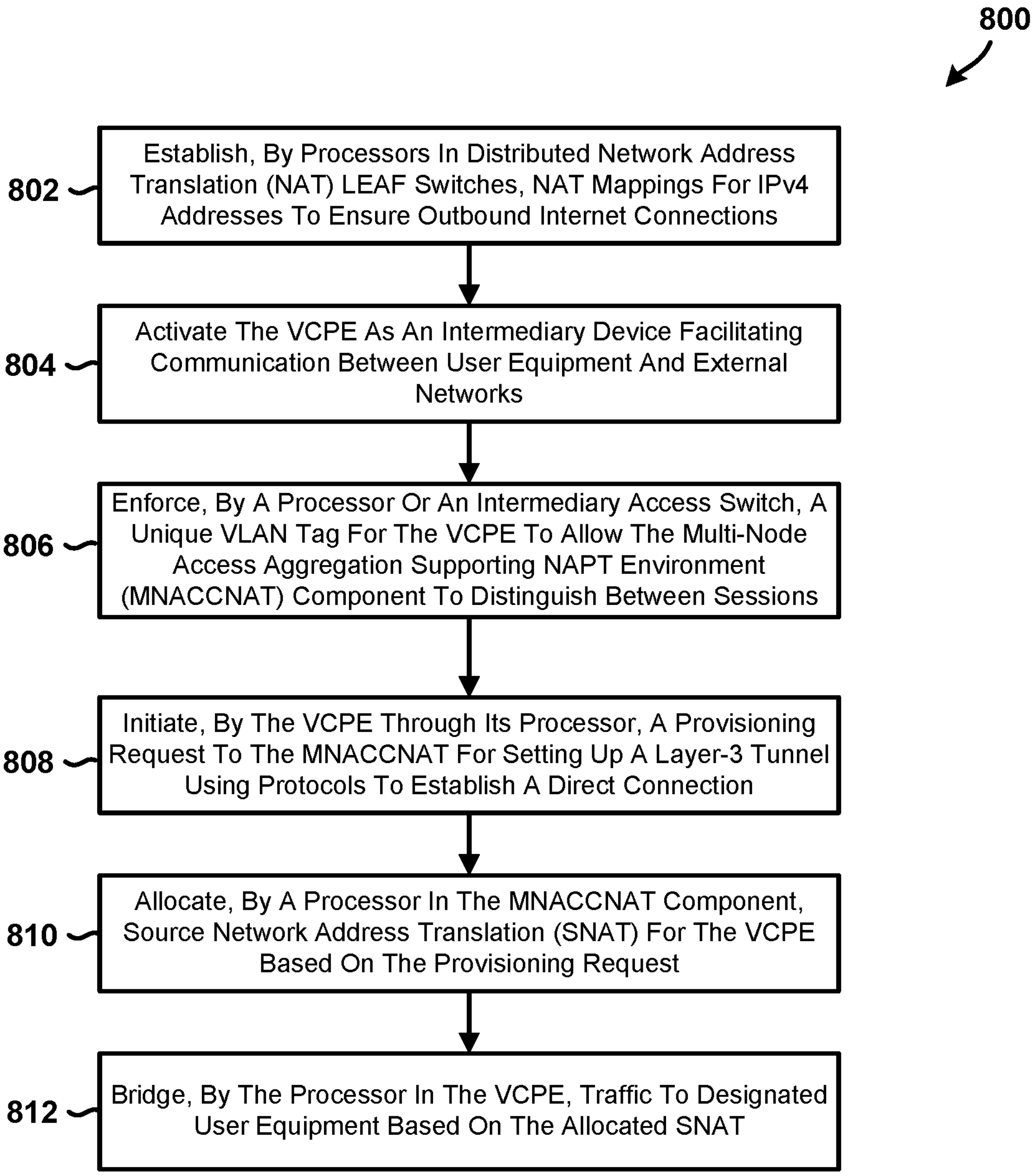
FIG. 8 is a process flow diagram illustrating a method of dynamic routing and provisioning in distributed computing environments that include virtual customer premises equipment (vCPE) in accordance with some embodiments.

FIG. 8 illustrates a method 800 of dynamic routing and provisioning in distributed computing environments that include virtual customer premises equipment (vCPE) in accordance with some embodiments. Method 800 may be performed by one or more processors or processing systems in a network computing system.

In block 802, processors in distributed network address translation (NAT) LEAF switches may establish NAT mappings for IPv4 addresses to ensure outbound internet connections.

In block 804, the processor may activate the vCPE as an intermediary device facilitating communication between user equipment and external networks.

In block 806, a processor or an intermediary access switch may enforce a unique VLAN tag for the vCPE to allow the multi-node access aggregation supporting NAPT environment (MNACCNAT) component to distinguish between sessions.

In block 808, a processor in the vCPE may initiate a provisioning request to the MNACCNAT for setting up a layer-3 tunnel using protocols to establish a direct connection.

In block 810, a processor in the MNACCNAT component may allocate source network address translation (SNAT) for the vCPE based on the provisioning request.

In block 812, the processor in the vCPE may bridge traffic to designated user equipment based on the allocated SNAT.

Figure 9:
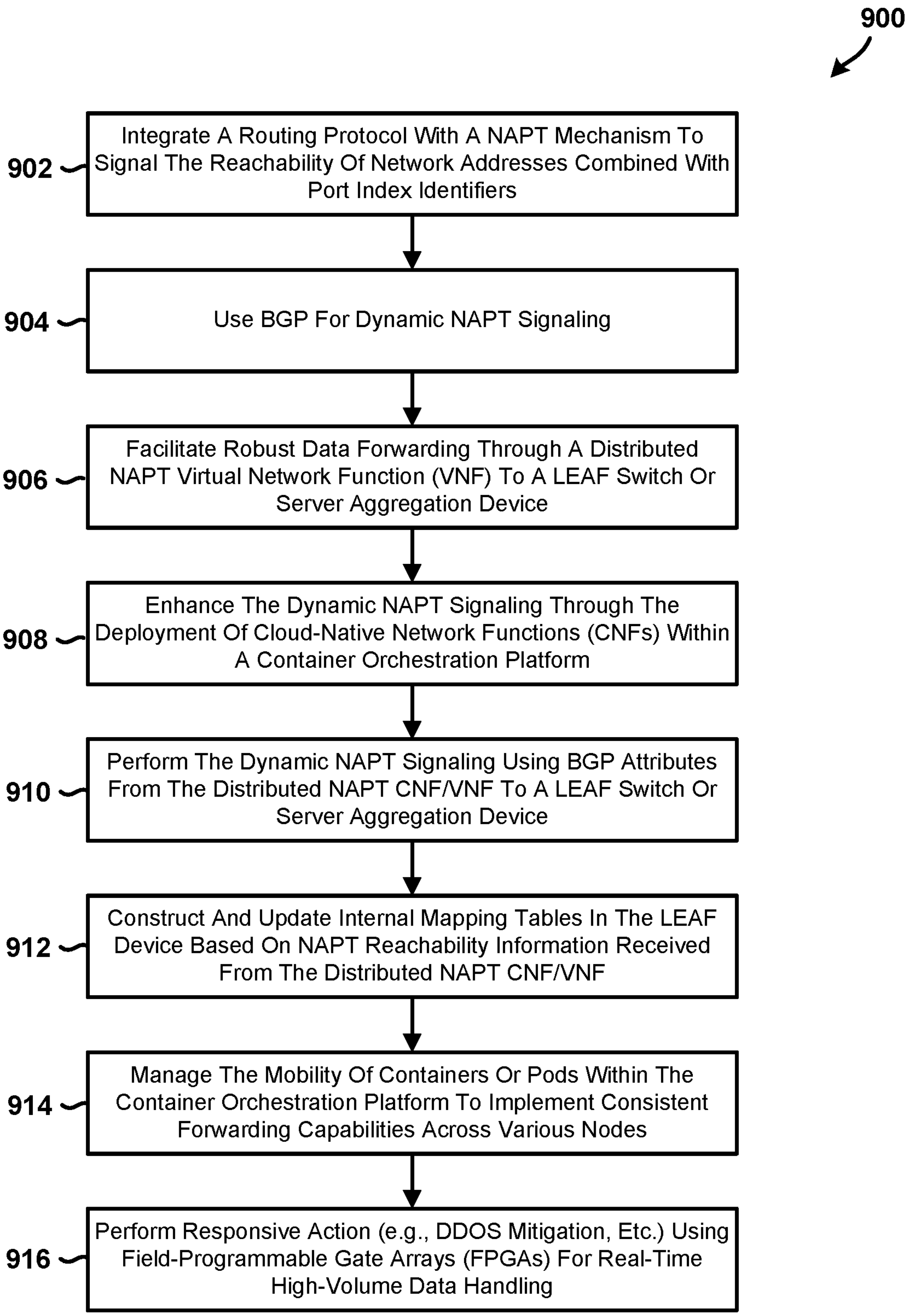
FIG. 9 is a process flow diagram illustrating a method of dynamic network address port translation (NAPT) signaling in a network computing device in accordance with some embodiments.

FIG. 9 illustrates a method 900 of dynamic network address port translation (NAPT) signaling in a network computing device in accordance with some embodiments. Method 900 may be performed by one or more processors or processing systems in a network computing system.

In block 902, the processor may integrate a routing protocol with a NAPT mechanism to signal the reachability of network addresses combined with port index identifiers.

In block 904, the processor may use BGP for dynamic NAPT signaling.

In block 906, the processor may facilitate robust data forwarding through a distributed NAPT VNF to a LEAF switch or server aggregation device.

In block 908, the processor may enhance the dynamic NAPT signaling through the deployment of CNFs within a container orchestration platform.

In block 910, the processor may perform the dynamic NAPT signaling using BGP attributes from the distributed NAPT CNF/VNF to a LEAF switch or server aggregation device.

In block 912, the processor may construct and update internal mapping tables in the LEAF device based on NAPT reachability information received from the distributed NAPT CNF/VNF.

In block 914, the processor may manage the mobility of containers or pods within the container orchestration platform to implement consistent forwarding capabilities across various nodes.

In block 916, the processor may perform a responsive action (e.g., DDOS mitigation, etc.) using field-programmable gate arrays (FPGAs) for real-time high-volume data handling.

Some embodiments may include methods of dynamic routing and provisioning in distributed computing environments or facilitating data forwarding in a network computing device through dynamic source network address translation (SNAT). In some embodiments, the methods may include receiving, by a processor in a distributed SNAT smart LEAF layer component, network address translation (NAT) mappings for IPv4 addresses, initiating, by the processor in a customer premises equipment (CPE), a NAT Provisioning Request for communicating with external networks, sending, by the processor, the NAT provisioning request to a multi-node access aggregation supporting NAPT environment (MNACCNAT) component, receiving, by a processor in the MNACCNAT component, the NAT provisioning request from the CPE, issuing, by the processor in the MNACCNAT component, a proxy provisioning request to a provisioning component, sending, by the provisioning components, provisioning responses to the MNACCNAT function (which relays these responses to the respective CPE), and advertising, by a processor in the MNACCNAT component, the presence of the CPE by IPv4 address plus a port set identifier and IPv4 next hop atomic object to distributed NAT LEAF switches.

Some embodiments may include methods of dynamic routing and provisioning in distributed computing environments that include virtual customer premises equipment (vCPE). In some embodiments, the methods may include establishing, by processors in distributed NAT LEAF switches, NAT mappings for IPv4 addresses to ensure outbound internet connections, bringing a vCPE online as an intermediary device that facilities communication between user equipment and external networks, enforcing, by a processor or an intermediary access switch, a unique VLAN tag for the vCPE to allow the multi-node access aggregation supporting NAPT environment (MNACCNAT) component to distinguish between sessions, initiating, by the vCPE through its processor, a provisioning request to the MNACCNAT for setting up a layer-3 tunnel using protocols to establish a direct connection, allocating, by a processor in the MNACCNAT component, SNAT for the vCPE based on the provisioning request, and bridging, by the processor in the vCPE, traffic to designated user equipment based on the allocated SNAT.

Some embodiments may include methods of dynamic source network address translation (SNAT) signaling in a network computing device. In some embodiments, the methods may include establishing, by a processor, a routing protocol to exchange routing and reachability information among autonomous systems on the internet, integrating, by the processor, the routing protocol with a source network address translation (SNAT) mechanism to signal the reachability of network addresses combined with port index identifiers, using, by the processor, border gateway protocol (BGP) for dynamic SNAT signaling, facilitating, by the processor, robust data forwarding through a distributed SNAT virtual network function (VNF) to a LEAF switch or server aggregation device, enhancing, by the processor, the dynamic SNAT signaling through the deployment of cloud-native network functions (CNFs) within a container orchestration platform (e.g., Kubernetes environment, etc.) performing, by the processor, the dynamic SNAT signaling using BGP attributes from the distributed SNAT CNF/VNF to a LEAF switch or server aggregation device, constructing and updating, by the processor, internal mapping tables in the LEAF device based on SNAT reachability information received from the distributed SNAT CNF/VNF, managing, by the processor, the mobility of containers or pods within container orchestration platforms to ensure consistent forwarding capabilities across various nodes, and performing, by the processor, distributed denial of service (DDoS) mitigation operations using field-programmable gate arrays (FPGAs) for real-time, high-volume data handling.

Some embodiments may include methods of dynamic source network address translation (SNAT) signaling within a distributed network system. In some embodiments, the method may include establishing a connection between a routing protocol and an SNAT mechanism, signaling reachability of network addresses through the routing protocol (e.g., border gateway protocol (BGP), etc.), associating the network addresses with port index identifiers, dynamically managing SNAT operations across the distributed network system through a distributed SNAT virtual network function (VNF) or cloud-native network function (CNF), and/or facilitating data forwarding from the distributed SNAT VNF/CNF to a network aggregation device that aggregates traffic from multiple sources within the distributed network system and acts as a central point for data processing and routing.

Some embodiments may include methods of enhancing data flow efficiency and security in a distributed computing environment. In some embodiments, the method may include using BGP for dynamic SNAT signaling within the distributed computing environment, deploying a distributed SNAT VNF for robust data forwarding to a LEAF switch or server aggregation device, integrating CNFs within a Container orchestration platform environment to enhance the scalability and resilience of the SNAT signaling, using BGP attributes for SNAT signaling from the distributed SNAT CNF/VNF to the LEAF device, configuring the LEAF device to receive SNAT reachability information (including network addresses and port index identifiers, for constructing and updating internal mapping tables, etc.), and managing mobility of containers or pods within the Container orchestration platform environment to ensure consistent forwarding capabilities across various nodes.

Some embodiments may include methods of mitigating distributed denial of service (DDoS) attacks within a distributed network system. In some embodiments, the method may include implementing dynamic SNAT signaling using BGP within the distributed network system, facilitating data forwarding through a distributed SNAT VNF/CNF to a LEAF switch or server aggregation device, enhancing the dynamic SNAT signaling with the deployment of VNF/CNFs within a Container orchestration platform environment, performing the SNAT signaling using BGP attributes from the distributed SNAT CNF/VNF to the LEAF device, integrating traditional network processing units with field-programmable gate arrays (e.g., for real-time, high-volume data handling and DDoS mitigation, etc.), and using the LEAF device for constructing and updating internal mapping tables based on SNAT reachability information.

Figure 10:
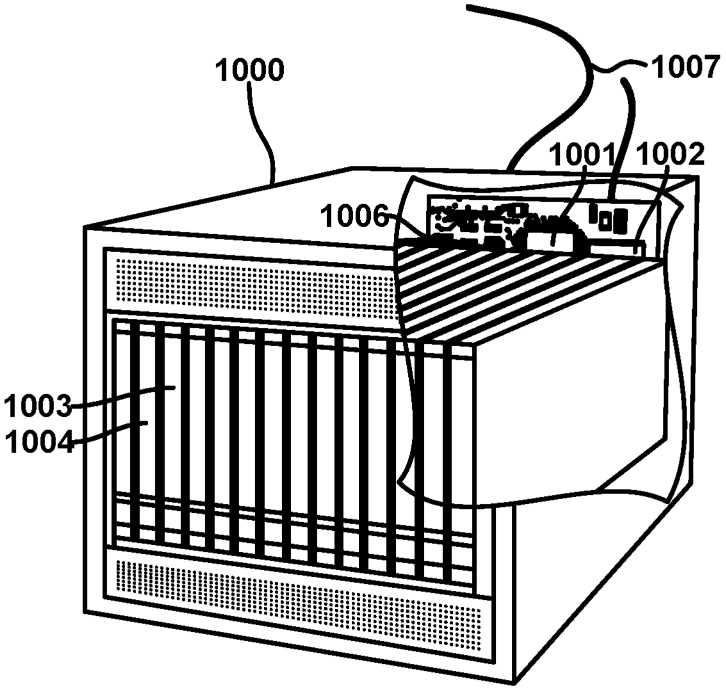
FIG. 10 is a component diagram of an example server suitable for implementing various embodiments disclosed herein.

FIG. 10 is a component block diagram of a computing device 1000 suitable for use with various embodiments. With reference to FIGS. 1-10, various embodiments may be implemented on a variety of computing devices 1000, an example of which is illustrated in FIG. 10 in the form of a server. The computing device 1000 may include a processor 1001 coupled to volatile memory 1002 and a large capacity nonvolatile memory, such as a disk drive 1003. The server device 1000 may also include a floppy disc drive 1004, USB, etc. coupled to the processor 1001. The server device 1000 may also include network access ports 1006 coupled to the processor 1001 for establishing data connections with a network connection circuit 1006 and a communication network 1007 (e.g., an Internet protocol (IP) network) coupled to other communication system network elements.

The processors or processing units discussed in this application may be any programmable microprocessor, microcomputer, or multiple processor chip or chips that can be configured by software instructions (applications) to perform a variety of functions, including the functions of various embodiments described.

In some computing devices, multiple processors may be provided, such as one processor within first circuitry dedicated to wireless communication functions and one processor within a second circuitry dedicated to running other applications. Software applications may be stored in the memory before they are accessed and loaded into the processor. The processors may include internal memory sufficient to store the application software instructions.

Implementation examples are described in the following paragraphs. While some of the following implementation examples are described in terms of example methods, further example implementations may include: the example methods discussed in the following paragraphs implemented by a computing device including a processor configured (e.g., with processor-executable instructions) to perform operations of the methods of the following implementation examples; the example methods discussed in the following paragraphs implemented by a computing device including means for performing functions of the methods of the following implementation examples; and the example methods discussed in the following paragraphs may be implemented as a non-transitory processor-readable storage medium having stored thereon processor-executable instructions configured to cause a processor of a computing device to perform the operations of the methods of the following implementation examples.

Example 1: A method of signaling the reachability of network addresses combined with port index identifiers, including receiving, by a processor in a LEAF switch, a border gateway protocol (BGP) signal indicating network address translation (NAT) reachability, the BGP signal including BGP attributes, a network address, and a port index identifier, traversing the received BGP attributes to extract relevant NAT information, using the extracted NAT information to update internal mapping tables within the LEAF switch, receiving incoming data packets, using the updated mapping tables to identify a correct atomic forwarding unit in a container orchestration platform, forwarding the data packet to the identified atomic forwarding unit, and dynamically adjusting the routing in response to determining that the identified atomic forwarding unit has moved to a different node.

Example 2: The method of example 1, further including monitoring network traffic to detect special cases that are not handled by standard network processing units (NPUs), and activating field-programmable gate arrays (FPGAs) or other intelligent network data processing units in response to detecting a special case that is not handled by standard NPUs.

Example 3: The method of any of the examples 1 and 2, in which receiving the BGP signal indicating NAT reachability includes receiving a BGP signal indicating source network address translation SNAT reachability, traversing the received BGP attributes to extract relevant NAT information includes traversing the received BGP attributes to extract relevant SNAT information, and using the extracted NAT information to update internal mapping tables within the LEAF switch includes using the extracted SNAT information to update internal mapping tables within the LEAF switch.

Example 4: The method of any of the examples 1-3, in which receiving the BGP signal indicating SNAT reachability includes receiving a BGP signal indicating network address port translation (NAPT) reachability, traversing the received BGP attributes to extract relevant SNAT information includes traversing the received BGP attributes to extract relevant NAPT information, and using the extracted SNAT information to update internal mapping tables within the LEAF switch includes using the extracted NAPT information to update internal mapping tables within the LEAF switch.

Example 5: A method for dynamic routing and provisioning in a distributed computing system through dynamic source network address translation (SNAT), the method including receiving, by a processor in a distributed SNAT smart LEAF layer component, network address translation (NAT) mappings for IPv4 addresses, initiating, by a processor in a customer premises equipment (CPE), a NAT Provisioning Request for communicating with external networks, sending, by the processor in the CPE, the NAT provisioning request to a multi-node access aggregation supporting NAPT environment (MNACCNAT) component, issuing, by a processor in the MNACCNAT component, a proxy provisioning request to a provisioning component in response to receiving the NAT provisioning request from the CPE, sending, by the provisioning components, provisioning responses to the MNACCNAT function, which relays these responses to the respective CPE, and advertising, by the processor in the MNACCNAT component, the presence of the CPE by IPv4 address plus a port set identifier and IPv4 next hop atomic object to distributed NAT LEAF switches.

Example 6: The method of example 5, in which receiving the NAT mappings for the IPv4 addresses by the processor in the distributed SNAT smart LEAF layer component includes receiving the NAT mappings for the IPv4 addresses by a processor in a distributed network address port translation (NAPT) smart LEAF layer component.

Example 7: A method for dynamic routing and provisioning in distributed computing environments that include virtual customer premises equipment (vCPE), including establishing, by processors in distributed network address translation (NAT) LEAF switches, NAT mappings for IPv4 addresses to ensure outbound internet connections, activating the vCPE as an intermediary device facilitating communication between user equipment and external networks, enforcing, by a processor or an intermediary access switch, a unique VLAN tag for the vCPE to allow the multi-node access aggregation supporting NAPT environment (MNACCNAT) component to distinguish between sessions, initiating, by the vCPE through its processor, a provisioning request to the MNACCNAT for setting up a layer-3 tunnel using protocols to establish a direct connection, allocating, by a processor in the MNACCNAT component, source network address translation (SNAT) for the vCPE based on the provisioning request, and bridging, by the processor in the vCPE, traffic to designated user equipment based on the allocated SNAT.

Example 8: The method of example 7, in which allocating the SNAT for the vCPE based on the provisioning request includes allocating network address port translation (NAPT) for the vCPE based on the provisioning request, and bridging traffic to designated user equipment based on the allocated SNAT includes bridging traffic to designated user equipment based on the allocated NAPT.

Example 9: A method for dynamic network address port translation (NAPT) signaling in a network computing device, including integrating, by a processor, a routing protocol with a NAPT mechanism to signal the reachability of network addresses combined with port index identifiers, using, by the processor, border gateway protocol (BGP) for dynamic NAPT signaling, facilitating, by the processor, robust data forwarding through a distributed NAPT virtual network function (VNF) to a LEAF switch or server aggregation device, enhancing, by the processor, the dynamic NAPT signaling through the deployment of cloud-native network functions (CNFs) within a container orchestration platform, performing, by the processor, the dynamic NAPT signaling using BGP attributes from the distributed NAPT CNF/VNF to a LEAF switch or server aggregation device, constructing and updating, by the processor, internal mapping tables in the LEAF device based on NAPT reachability information received from the distributed NAPT CNF/VNF, and managing, by the processor, the mobility of containers or pods within the container orchestration platform to implement consistent forwarding capabilities across the various nodes.

Example 10: The method of example 9, further including performing distributed denial of service (DDoS) mitigation using field-programmable gate arrays (FPGAs) for real-time, high-volume data handling.

As used in this application, terminology such as "component," "module," "system," etc., is intended to encompass a computer-related entity. These entities may involve, among other possibilities, hardware, firmware, a blend of hardware and software, software alone, or software in an operational state. As examples, a component may encompass a running process on a processor, the processor itself, an object, an executable file, a thread of execution, a program, or a computing device. To illustrate further, both an application operating on a computing device and the computing device itself may be designated as a component. A component might be situated within a single process or thread of execution or could be distributed across multiple processors or cores. In addition, these components may operate based on various non-volatile computer-readable media that store diverse instructions and/or data structures. Communication between components may take place through local or remote processes, function or procedure calls, electronic signaling, data packet exchanges, memory interactions, among other known methods of network, computer, processor, or process-related communications.

A number of different types of memories and memory technologies are available or contemplated in the future, any or all of which may be included and used in systems and computing devices that implement the various embodiments. Such memory technologies/types may include non-volatile random-access memories (NVRAM) such as Magnetoresistive RAM (M-RAM), resistive random access memory (ReRAM or RRAM), phase-change random-access memory (PC-RAM, PRAM or PCM), ferroelectric RAM (F-RAM), spin-transfer torque magnetoresistive random-access memory (STT-MRAM), and three-dimensional cross point (3D-XPOINT) memory. Such memory technologies/types may also include non-volatile or read-only memory (ROM) technologies, such as programmable read-only memory (PROM), field programmable read-only memory (FPROM), one-time programmable non-volatile memory (OTP NVM). Such memory technologies/types may further include volatile random-access memory (RAM) technologies, such as dynamic random-access memory (DRAM), double data rate (DDR) synchronous dynamic random-access memory (DDR SDRAM), static random-access memory (SRAM), and pseudostatic random-access memory (PSRAM). Systems and computing devices that implement the various embodiments may also include or use electronic (solid-state) non-volatile computer storage mediums, such as FLASH memory. Each of the above-mentioned memory technologies include, for example, elements suitable for storing instructions, programs, control signals, and/or data for use in a computing device, system on chip (SOC) or other electronic component. Any references to terminology and/or technical details related to an individual type of memory, interface, standard or memory technology are for illustrative purposes only, and not intended to limit the scope of the claims to a particular memory system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store target program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of signaling the reachability of network addresses combined with port set identifiers, comprising:

receiving, by a processor in a LEAF switch, a border gateway protocol (BGP) signal indicating network address translation (NAT) reachability, the BGP signal including BGP attributes, a network address, and a port set identifier that identifies a range of port numbers;

traversing the received BGP attributes to extract relevant NAT information;

using the extracted NAT information to update internal mapping tables within the LEAF switch;

receiving an incoming data packet;

using the updated mapping tables to identify, based on a destination network address of the incoming data packet and a port set identifier corresponding to a destination port of the incoming data packet, a container or pod in a container orchestration platform;

forwarding the data packet to the identified container or pod; and dynamically adjusting the routing in response to determining that the identified container or pod has moved to a different node.

2. The method of claim 1, further comprising:

monitoring network traffic to detect special cases that are not handled by standard network processing units (NPUs); and activating field-programmable gate arrays (FPGAs) or other intelligent network data processing units in response to detecting a special case that is not handled by standard NPUs.

3. The method of claim 1, wherein:

receiving the BGP signal indicating NAT reachability comprises receiving a BGP signal indicating source network address translation SNAT reachability;

traversing the received BGP attributes to extract relevant NAT information comprises traversing the received BGP attributes to extract relevant SNAT information; and using the extracted NAT information to update internal mapping tables within the LEAF switch comprises using the extracted SNAT information to update internal mapping tables within the LEAF switch.

4. The method of claim 3, wherein:

receiving the BGP signal indicating SNAT reachability comprises receiving a BGP signal indicating network address port translation (NAPT) reachability;

traversing the received BGP attributes to extract relevant SNAT information comprises traversing the received BGP attributes to extract relevant NAPT information; and using the extracted SNAT information to update internal mapping tables within the LEAF switch comprises using the extracted NAPT information to update internal mapping tables within the LEAF switch.

5. A LEAF switch computing device, comprising:

a processor configured to:

receive a border gateway protocol (BGP) signal indicating network address translation (NAT) reachability, the BGP signal including BGP attributes, a network address, and a port set identifier that identifies a range of port numbers;

traverse the received BGP attributes to extract relevant NAT information;

use the extracted NAT information to update internal mapping tables within the LEAF switch;

receive an incoming data packet;

use the updated mapping tables to identify, based on a destination network address of the incoming data packet and a port set identifier corresponding to a destination port of the incoming data packet, a container or pod in a container orchestration platform;

forward the data packet to the identified container or pod; and dynamically adjust the routing in response to determining that the identified container or pod has moved to a different node.

6. The LEAF switch computing device of claim 5, wherein the processor is further configured to:

monitor network traffic to detect special cases that are not handled by standard network processing units (NPUs); and activate field-programmable gate arrays (FPGAs) or other intelligent network data processing units in response to detecting a special case that is not handled by standard NPUs.

7. The LEAF switch computing device of claim 5, wherein the processor is configured to:

receive the BGP signal indicating NAT reachability by receiving a BGP signal indicating source network address translation SNAT reachability;

traverse the received BGP attributes to extract relevant NAT information by traversing the received BGP attributes to extract relevant SNAT information; and use the extracted NAT information to update internal mapping tables within the LEAF switch by using the extracted SNAT information to update internal mapping tables within the LEAF switch.

8. The LEAF switch computing device of claim 7, wherein the processor is configured to:

receive the BGP signal indicating SNAT reachability by receiving a BGP signal indicating network address port translation (NAPT) reachability;

traverse the received BGP attributes to extract relevant SNAT information by traversing the received BGP attributes to extract relevant NAPT information; and use the extracted SNAT information to update internal mapping tables within the LEAF switch by using the extracted NAPT information to update internal mapping tables within the LEAF switch.

9. A non-transitory computer readable storage medium having stored thereon processor-executable software instructions configured to cause a processor to perform operations for signaling the reachability of network addresses combined with port set identifiers, the operations comprising:

receiving a border gateway protocol (BGP) signal indicating network address translation (NAT) reachability, the BGP signal including BGP attributes, a network address, and a port set identifier;

traversing the received BGP attributes to extract relevant NAT information;

using the extracted NAT information to update internal mapping tables within a LEAF switch;

receiving an incoming data packet;

using the updated mapping tables to identify, based on a destination network address of the incoming data packet and a port set identifier corresponding to a destination port of the incoming data packet, a container or pod in a container orchestration platform;

forwarding the data packet to the identified container or pod; and dynamically adjusting the routing in response to determining that the identified container or pod has moved to a different node.

10. The non-transitory computer readable storage medium of claim 9, wherein the stored processor-executable software instructions are configured to cause a processor to perform operations further comprising:

monitoring network traffic to detect special cases that are not handled by standard network processing units (NPUs); and activating field-programmable gate arrays (FPGAs) or other intelligent network data processing units in response to detecting a special case that is not handled by standard NPUs.

11. The non-transitory computer readable storage medium of claim 9, wherein the stored processor-executable software instructions are configured to cause a processor to perform operations such that:

receiving the BGP signal indicating NAT reachability comprises receiving a BGP signal indicating source network address translation SNAT reachability;

traversing the received BGP attributes to extract relevant NAT information comprises traversing the received BGP attributes to extract relevant SNAT information; and using the extracted NAT information to update internal mapping tables within the LEAF switch comprises using the extracted SNAT information to update internal mapping tables within the LEAF switch.

12. The non-transitory computer readable storage medium of claim 11, wherein the stored processor-executable software instructions are configured to cause a processor to perform operations such that:

receiving the BGP signal indicating SNAT reachability comprises receiving a BGP signal indicating network address port translation (NAPT) reachability;

traversing the received BGP attributes to extract relevant SNAT information comprises traversing the received BGP attributes to extract relevant NAPT information; and using the extracted SNAT information to update internal mapping tables within the LEAF switch comprises using the extracted NAPT information to update internal mapping tables within the LEAF switch.

* * * * *